United States Patent
Marsden et al.

(10) Patent No.: US 8,273,237 B2
(45) Date of Patent: Sep. 25, 2012

(54) METHOD AND APPARATUS FOR ELECTROWINNING COPPER USING AN ATMOSPHERIC LEACH WITH FERROUS/FERRIC ANODE REACTION ELECTROWINNING

(75) Inventors: John O. Marsden, Paradise Valley, AZ (US); James D. Gillaspie, Gilbert, AZ (US); John C. Wilmot, Anthem, AZ (US)

(73) Assignee: Freeport-McMoran Corporation, Phoenix, AZ (US)

( * ) Notice: Subject to any disclaimer, the term of this patent is extended or adjusted under 35 U.S.C. 154(b) by 753 days.

(21) Appl. No.: 12/355,624

(22) Filed: Jan. 16, 2009

(65) Prior Publication Data
US 2009/0183997 A1 Jul. 23, 2009

Related U.S. Application Data

(60) Provisional application No. 61/021,694, filed on Jan. 17, 2008.

(51) Int. Cl.
C25C 1/12 (2006.01)
C25C 1/00 (2006.01)
C25C 1/22 (2006.01)
(52) U.S. Cl. ........ 205/580; 205/568; 205/581; 205/583; 205/584; 205/574; 205/589; 205/604
(58) Field of Classification Search ............... None
See application file for complete search history.

(56) References Cited

U.S. PATENT DOCUMENTS

| 2,792,342 | A | | 5/1957 | Tuwiner |
|---|---|---|---|---|
| 3,103,414 | A | | 9/1963 | Thornhill |
| 3,262,870 | A | | 7/1966 | Harlan |
| 3,264,099 | A | | 8/1966 | Johnson |
| 3,544,306 | A | | 12/1970 | McGauley |
| 3,616,277 | A | | 10/1971 | Adamson et al. |
| 3,632,498 | A | | 1/1972 | Beer |
| 3,703,358 | A | | 11/1972 | Carson et al. |
| 3,711,385 | A | | 2/1973 | Beer |
| 3,853,724 | A | | 12/1974 | Wojeik et al. |
| 3,876,516 | A | | 4/1975 | Pace et al. |
| 3,887,396 | A | | 6/1975 | Walsh et al. |
| 3,915,834 | A | | 10/1975 | Wright et al. |
| 3,956,086 | A | | 5/1976 | Wilkinson et al. |
| 3,972,795 | A | * | 8/1976 | Goens et al. ............ 204/269 |
| 3,973,949 | A | * | 8/1976 | Goens et al. ............ 205/369 |
| 3,979,275 | A | | 9/1976 | Harvey et al. |

(Continued)

FOREIGN PATENT DOCUMENTS

CA 1162514 2/1984
(Continued)

OTHER PUBLICATIONS

International Preliminary Report on Patentability (Chapter 1) for corresponding PCT Application No. PCT/US09/031312 dated Jul. 29, 2010.

(Continued)

*Primary Examiner* — Harry D Wilkins, III
(74) *Attorney, Agent, or Firm* — Snell & Wilmer L.L.P.

(57) ABSTRACT

The present invention relates, generally, to a method and apparatus for recovering metal values from a metal-bearing materials, and more specifically, a process for recovering copper and other metals through leaching, electrowinning using the ferrous/ferric anode reaction, and the synergistic addition of ferrous iron to the leach step.

5 Claims, 10 Drawing Sheets

U.S. PATENT DOCUMENTS

| | | | |
|---|---|---|---|
| 3,981,353 A | 9/1976 | Knight | |
| 4,071,431 A | 1/1978 | Nicou et al. | |
| 4,098,668 A | 7/1978 | Andersen et al. | |
| 4,129,494 A | 12/1978 | Norman | |
| 4,152,142 A | 5/1979 | Schlitt, III et al. | |
| 4,201,653 A | 5/1980 | O'Neill et al. | |
| 4,219,401 A | 8/1980 | Johnson | |
| 4,226,685 A | 10/1980 | Portal et al. | |
| 4,230,542 A | 10/1980 | Traini et al. | |
| 4,236,918 A | 12/1980 | Narain | |
| 4,243,411 A | 1/1981 | Anderson | |
| 4,256,553 A | 3/1981 | Baczek et al. | |
| 4,272,339 A | 6/1981 | Knight et al. | |
| 4,278,521 A | 7/1981 | Kreysa | |
| 4,288,305 A | 9/1981 | Garritsen et al. | |
| 4,292,160 A | 9/1981 | Marcantonio | |
| 4,318,789 A | 3/1982 | Marcantonio | |
| 4,373,654 A | 2/1983 | Prengaman et al. | |
| 4,399,020 A | 8/1983 | Branchick et al. | |
| 4,436,601 A | 3/1984 | Branchick et al. | |
| 4,445,990 A | 5/1984 | Kim et al. | |
| 4,515,672 A | 5/1985 | Platek et al. | |
| 4,556,469 A | 12/1985 | Kim et al. | |
| 4,560,453 A | 12/1985 | Hoffman et al. | |
| 4,565,748 A | 1/1986 | Dahl | |
| 4,634,467 A | 1/1987 | Ochs | |
| 4,680,100 A | 7/1987 | Morin | |
| 4,715,934 A | 12/1987 | Tamminen | |
| 4,762,603 A | 8/1988 | Morin | |
| 4,776,941 A | 10/1988 | Tezanos et al. | |
| 4,789,450 A | 12/1988 | Paterson | |
| 4,834,850 A | 5/1989 | deNora et al. | |
| 4,863,580 A | 9/1989 | Epner | |
| 4,923,686 A * | 5/1990 | Dalton et al. | 423/38 |
| 4,960,500 A | 10/1990 | Epner | |
| 5,006,216 A | 4/1991 | Dietrich et al. | |
| 5,051,187 A * | 9/1991 | Matsumoto et al. | 210/639 |
| 5,128,012 A | 7/1992 | Olsen | |
| 5,133,843 A | 7/1992 | Eisman | |
| 5,277,777 A | 1/1994 | Olper et al. | |
| 5,292,412 A | 3/1994 | Pitton | |
| 5,324,409 A | 6/1994 | Mayr et al. | |
| 5,368,702 A | 11/1994 | deNora | |
| 5,454,917 A | 10/1995 | Mattison et al. | |
| 5,458,746 A | 10/1995 | Burgess et al. | |
| 5,492,608 A * | 2/1996 | Sandoval et al. | 204/237 |
| 5,516,412 A | 5/1996 | Andricacos et al. | |
| 5,622,615 A * | 4/1997 | Young et al. | 205/582 |
| 5,690,806 A | 11/1997 | Sunderland et al. | |
| 5,705,048 A | 1/1998 | Oxley et al. | |
| 5,725,752 A | 3/1998 | Sunderland et al. | |
| 5,770,037 A | 6/1998 | Goto et al. | |
| 5,783,050 A | 7/1998 | Coin et al. | |
| 5,795,466 A | 8/1998 | Kelebek et al. | |
| 5,837,122 A | 11/1998 | Snyder et al. | |
| 5,877,388 A | 3/1999 | Enda et al. | |
| 5,882,502 A | 3/1999 | Gomez | |
| 5,908,540 A | 6/1999 | Fanti | |
| 5,972,181 A | 10/1999 | Coin et al. | |
| 5,993,635 A | 11/1999 | Hourn et al. | |
| 6,017,428 A | 1/2000 | Hill et al. | |
| 6,086,691 A | 7/2000 | Lehockey et al. | |
| 6,086,733 A | 7/2000 | Carey et al. | |
| 6,110,253 A | 8/2000 | Kohr et al. | |
| 6,113,758 A | 9/2000 | deNora et al. | |
| 6,139,705 A | 10/2000 | Brown, Jr. et al. | |
| 6,149,797 A | 11/2000 | Carey et al. | |
| 6,159,356 A | 12/2000 | Zoppi | |
| 6,159,435 A | 12/2000 | Nguyen | |
| 6,214,179 B1 | 4/2001 | Cartner | |
| 6,231,730 B1 | 5/2001 | Davis et al. | |
| 6,277,341 B1 * | 8/2001 | Pinches et al. | 423/27 |
| 6,319,389 B1 | 11/2001 | Fountain et al. | |
| 6,340,423 B1 | 1/2002 | Duyvesteyn | |
| 6,352,622 B1 | 3/2002 | Brown et al. | |
| 6,391,170 B1 | 5/2002 | Day et al. | |
| 3,698,939 A1 | 6/2002 | Huens et al. | |
| 6,402,930 B1 | 6/2002 | Allen et al. | |
| 6,451,183 B1 | 9/2002 | Treasure et al. | |
| 6,537,440 B1 | 3/2003 | Richmond et al. | |
| 6,592,644 B2 | 7/2003 | Beckmann | |
| 6,607,474 B2 | 8/2003 | Chowdhury | |
| 6,656,722 B1 | 12/2003 | Ruitenberg et al. | |
| 7,591,934 B2 * | 9/2009 | Marsden et al. | 204/269 |
| 2004/0168909 A1 | 9/2004 | Larson | |
| 2005/0023151 A1 * | 2/2005 | Sandoval et al. | 205/574 |
| 2005/0269208 A1 * | 12/2005 | Dixon et al. | 205/583 |
| 2006/0226024 A1 | 10/2006 | Sandoval et al. | |

FOREIGN PATENT DOCUMENTS

| | | |
|---|---|---|
| DE | 19731616 | 1/1999 |
| EP | 0129845 | 10/1988 |
| EP | 0206941 | 10/1990 |
| FR | 2810681 | 12/2001 |
| JP | 02-229778 | 9/1990 |
| RU | 1813806 | 5/1993 |
| RU | 2169443 | 6/2001 |
| SU | 589290 | 1/1978 |
| SU | 715900 | 2/1980 |
| SU | 1708939 | 1/1982 |
| SU | 1090760 | 5/1984 |
| SU | 1183566 | 10/1985 |
| SU | 1243907 | 7/1986 |
| SU | 1346697 | 10/1987 |
| SU | 1418349 | 8/1988 |
| SU | 2121411 | 11/1988 |
| SU | 1537711 | 1/1990 |
| SU | 1708939 | 1/1992 |
| WO | WO 97/14825 | 4/1997 |
| WO | WO 00/43576 | 7/2000 |
| WO | WO 01/31072 | 5/2001 |
| WO | WO 2005/012597 | 2/2005 |
| WO | WO 2007/034413 | 3/2007 |
| WO | WO 2007/143807 | 12/2007 |

OTHER PUBLICATIONS

Alkire, et al.; "Flow-Through Porous Electrodes", J. Electrochem. Soc.; vol. 122, No. 12, pp. 1594-1601; Dec. 1975.

Marracino, et al.; "A First Investigation of Flow-Through Porous Electrodes Made of Metallic Felts or Foams"; Electrochimica Acta, Vo. 32, No. 9, pp. 1303-1309; 1987.

Popov, et al.; "The comparison of galvanostatic and potentiostatic copper powder deposition on platinum and aluminum electrodes"; Journal of Applied Electrochemistry, vol. 8, Jan. 3, 1978; pp. 503-514.

Jian Qi, et al.; "Analysis of flow-through porous electrode cell with homogenous chemical reactions: application to bromide oxidation in brine solutions"; Journal of Applied Electrochemistry, vol. 23, revised Jan. 8, 1993; pp. 873-886.

Saleh, et al.; "Electrowinning of Non-Noble Metals with Simultaneous Hydrogen Evolution at Flow-Through Porous Electrodes", J. Electrochem. Soc., vol. 142, No. 12, Dec. 1995; pp. 4122-4128.

Smirnov, et al.; "Theory, Production Technology, and Properties of Powders and Fibers"; Ural Scientific-Research and Design Institute of the Copper Industry; Translated from Poroshkovaya Metallurgiya, No. 3(291), pp. 1-4, Mar. 1987, original article submitted Mar. 25, 1986.

Usol'Tseva, et al.; "Production of Electrolytic Copper Powders on Rod Electrodes With Separating Layers"; Ural Polytechnic Institute; Translated from Poroshkovaya Metallurgiya, No. 11(299), pp. 4-8, Nov. 1987; original article submitted Dec. 29, 1986.

Allen, et al.; "Energy Savings by Means of Fuel Cell Electrodes in Electro-Chemical Industries", Dept. of Energy, Journal Announcement: GRAI8018; NSA0500, Mar. 19, 1979, p. 72.

Barbosa, et al.; "On-line coupling of electrochemical preconcentration in tungsten coil electrothermal atomic absorption spectrometry for determination of lead in natural waters", Spectrochimica Acta—Part B Atomic Spectroscopy, v. 54, n 8, 1999, p. 1155-1166.

Bechtold, et al.; "Optimization of multi-cathode membrane electrolyzers for the indirect electrochemical reduction of indigo"; Chemical Engineering & Technology, v. 21, n. 11, Nov. 1998; pp. 877-880.

Chin, Der-Tau; "Metal recovery from wastewater with an electrochemical method", Chemical Engineering Education, v. 36, No. 2, Spring 2002.

Cook, et al.; "Electrodeposition of copper in flow-through cathodes"; Abstract from Electrochemical Society Fall Meeting; pp. 76-77; Oct. 17-22, 1976.

Ford, et al.; "User Data Package for Implementation of Electrolytic Recovery Technology in Navy Electroplating Shops"; Naval Facilities Engineering Service Center, Report No. NFESC-TR-2046-ENV, Oct. 95, 83p.

Jorne, et al.; "Suppression of Dendrites and Roughness During Electrodeposition by Impinging Flow"; Journal of the Electrochemical Society, v. 134, n6, Jun. 1987, p. 1399-1402.

Lemon, et al.; "3-D Electrolytic Cell Provides New Option for Wastewater Recycle & Waste Minimization"; Renovare International, Inc., AESF/EPA Conference for Environmental Excellence—Jan. 2000.

Scholder, et al.; "Study of a Porous Cathode with Stacked Woven Screens"; Abstract—34th Meeting of International Society of Electrochemistry; Sep. 18, 1983.

Wiechmann, et al.; "The use of segmented intercell bars in electrowinning plants"; Electrometallurgy 2001, pp. 261-272.

Sandoval, et al.; "A substituted anode reaction for electrowinning copper"; Proceedings of COPPER95-Cobre 95 International Conference, vol. III—Electrorefining and Hydrometallurgy of Copper, pp. 423-435.

Sandoval, et al.; "Evaluation of the Ferrous/Ferric-Sulfur Dioxide Anode Reaction for Integration Into the Copper Leaching-Solvent Extraction-Electrowinning Circuit"; Chapter 66, Reno Research Center, U.S. Bureau of Mines, pp. 1091-1105.

Duby, Paul; "The History of Progress in Dimensionally Stable Anodes", JOM, Mar. 1993, pp. 41-43.

Dolinar, et al.; "Copper Electrowinning in the Absence of Acid Misting Using the Ferrous/Ferric-Sulfur Dioxide Anode Reaction—A Pilot Study"; Society for Mining, Metallurgy and Exploration, Inc., Transactions vol. 298, pp. 1936-1942, SME Annual Meeting, Mar. 6-9, 1995.

Smith, et al.: "Electrowinning/electrostripping and electrodialysis processes for the recovery and recycle of metals from plating rinse solutions"; Abstract from Proceedings of 9th Symposium on Separation Science and Technology for Energy Applications; Oct. 22-26, 1995.

Varentsov, et al.; "Electrochemical Extraction of Copper from Dilute Sulfuric Acid Solutions Onto Fibrous Graphite Flow-Through Cathodes"; Soviet Electrochemistry, v. 18, n. 3, Mar. 1982, p. 326-329 (Abstract only).

Zamyatin, et al.; "Experimental Study of the Factors Governing the Efficiency of Porous Cathodes in metal Extraction from Dilute Solutions"; Soviet Electrochemistry, v. 20, n. 6, Jun. 1984, p. 795-797 (Abstract only).

Dixon, David G.; "Galvanox—A Novel Process for the Treatment of Copper Concentrates"; UBC Hydrometallurgy (undated).

Misra, K.K., et al.; "Electrochemical Aspects of the Direct Electrowinning Copper From Sulfuric Acid Leach Solutions in the Presence of Iron Using Gas Sparging," Anodes for Electrowinning, Proceedings of the Sessions held at Aime Annual Meeting; Jan. 1, 1984, pp. 13-36.

The International Search Report and Written Opinion from corresponding International Application No. PCT/US2009-031312 dated Apr. 16, 2009.

Examination Report from corresponding Australian Patent Application No. 2009206007, dated Jun. 9, 2011, 2 pages.

* cited by examiner

METHOD AND APPARATUS FOR ELECTROWINNING COPPER USING AN ATMOSPHERIC LEACH WITH FERROUS/FERRIC ANODE REACTION ELECTROWINNING

CROSS-REFERENCE TO RELATED APPLICATION

This application is a non-provisional of and claims priority to U.S. Provisional Application Ser. No. 61/021,694 entitled "METHOD AND APPARATUS FOR ELECTROWINNING COPPER USING AN ATMOSPHERIC LEACH WITH FERROUS/FERRIC ANODE REACTION ELECTROWINNING" which was filed on Jan. 17, 2008 and is incorporated herewith by reference.

FIELD OF INVENTION

The present invention relates, generally, to a method and apparatus for recovering metal values from metal-bearing materials, and more specifically, to a process for recovering copper and other metals through leaching, electrowinning using the ferrous/ferric anode reaction, and the synergistic addition of ferrous iron to the leach step.

BACKGROUND OF THE INVENTION

Efficiency and cost-effectiveness of copper electrowinning is and for a long time has been important to the competitiveness of the domestic copper industry. Past research and development efforts in this area have thus focused—at least in part—on mechanisms for decreasing the total energy requirement for copper electrowinning, which directly impacts the cost-effectiveness of the electrowinning process.

Conventional copper electrowinning, wherein copper is plated from a rich electrolyte to a substantially pure cathode with an aqueous electrolyte, occurs by the following reactions:

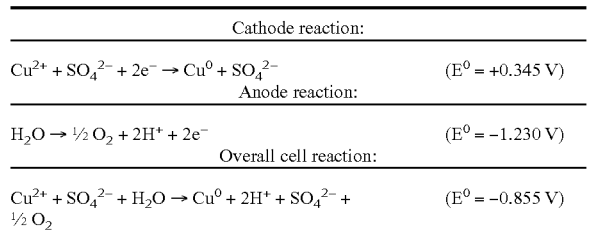

Conventional copper electrowinning according to the above reactions, however, exhibits several areas of potential improvement for, among other things, improved economics, increased efficiency, and reduced acid mist generation. First, in conventional copper electrowinning, the decomposition of water reaction at the anode produces oxygen ($O_2$) gas. When the liberated oxygen gas bubbles break the surface of the electrolyte bath, they create an acid mist. Reduction or elimination of acid mist is desirable. Second, the decomposition of water anode reaction used in conventional electrowinning contributes significantly to the overall cell voltage via the anode reaction equilibrium potential and the overpotential. The decomposition of water anode reaction exhibits a standard potential of 1.23 Volts (V), which contributes significantly to the total voltage required for conventional copper electrowinning. The typical overall cell voltage is approximately 2.0 V. A decrease in the anode reaction equilibrium potential and/or overpotential would reduce cell voltage, and thus conserve energy and decrease the total operating costs of the electrowinning operation.

One way that has been found to potentially reduce the energy requirement for copper electrowinning is to use the ferrous/ferric anode reaction, which occurs by the following reactions:

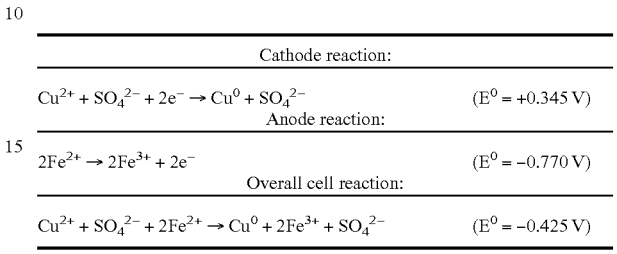

The ferric iron generated at the anode as a result of this overall cell reaction can be reduced back to ferrous iron using sulfur dioxide, as follows:

Solution Reaction:

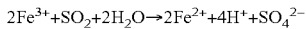

The use of the ferrous/ferric anode reaction in copper electrowinning cells lowers the energy consumption of those cells as compared to conventional copper electrowinning cells that employ the decomposition of water anode reaction, since the oxidation of ferrous iron ($Fe^{2+}$) to ferric iron ($Fe^{3+}$) occurs at a lower voltage than does the decomposition of water.

The recovery of copper via electrowinning can also be limited by processes that prepare the copper containing material for optimal recovery. Leaching is one such processing step. The mechanism by which leaching processes effectuate the release of copper from sulfide mineral matrices, such as chalcopyrite, is generally dependent on temperature, oxygen and/or oxidizing agent availability, pressure, and process chemistry. In atmospheric leaching in ferric sulfate media, the dominant oxidation reaction is believed to be as follows:

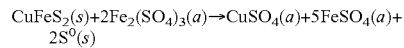

Thus, it is advantageous to use a copper preparation process, such as leaching, that produces ferrous iron ($Fe^{2+}$) to allow for electrowinning of the prepared copper with a ferrous/ferric anode reaction process.

SUMMARY OF THE INVENTION

The present invention relates, generally, to a method and apparatus for recovering metal values from metal-bearing materials, and more specifically, to a process for recovering copper and other metals through leaching, electrowinning using the ferrous/ferric anode reaction, and the synergistic addition of ferrous iron to the leach step. This improved process and apparatus disclosed herein achieve an advancement in the art by providing a metal value recovery system that enables significant enhancement in energy consumption and consumption of raw materials as compared to conventional metal value recovery processes and previous attempts to apply the ferrous/ferric anode reaction to electrowinning operations. As used herein, the term "alternative anode reaction" refers to the ferrous/ferric anode reaction, and the term "alternative anode reaction process" refers to any electrowinning process in which the ferrous/ferric anode reaction is employed.

In an exemplary embodiment, ferrous iron is recycled in a leach step. Preferably, in an exemplary embodiment of this invention, the ferrous iron species is pyrite, most preferably, pyrite is recycled from a solid/liquid phase separation stage or from a size or gravity based separation process after the leaching step. In various embodiments, ferric iron from a downstream electrowinning may also be recycled into a leach step. This improved process and apparatus disclosed herein achieves advancement in the art by producing increased amounts of ferrous iron in the leached product slurry, thereby allowing for direct electrowinning in connection with a ferrous/ferric anode reaction process.

Furthermore, in an exemplary embodiment of this invention, one or more leach steps may be subjected to a ferrous iron addition and a subsequent direct electrowinning using an alternative anode reaction process. Again, in one aspect of this exemplary embodiment of the present invention the ferrous iron species can be pyrite, most preferably, pyrite which is recycled from a solid/liquid phase separation stage after the leaching step.

In various embodiments, a method is provided comprising providing an ore comprising a metal value and iron, leaching the ore to yield a metal bearing slurry comprising the metal value and ferrous iron, separating the metal bearing slurry into a metal bearing solution comprising the metal value and a first portion of the ferrous iron and a metal bearing solid comprising a second portion of the ferrous iron, recycling the second portion of the ferrous iron into the ore, electrowinning the metal bearing solution, oxidizing the first portion of ferrous iron to ferric iron, recovering the metal value from the metal bearing solution and recycling the ferric iron to the ore.

In still other embodiments, a method is provided comprising providing an ore comprising a metal value and iron, leaching the ore to yield a metal bearing slurry comprising the metal value and ferrous iron, separating the metal bearing slurry into a metal bearing solution comprising the metal value and a first portion of the ferrous iron and a metal bearing solid comprising a second portion of the ferrous iron, recycling the second portion of the ferrous iron into the ore, extracting the metal value and the ferrous iron from the metal bearing solution to yield a rich electrolyte, electrowinning the rich electrolyte, oxidizing the first portion of ferrous iron to ferric iron, recovering the metal value from the rich electrolyte, and recycling the ferric iron into the ore.

In further embodiments, a method is provided comprising providing a material comprising a metal value and pyrite, leaching said material to yield a metal bearing slurry, separating said metal bearing slurry into a metal bearing solution and a solids component comprising at least a portion of said pyrite, recycling at least a portion of said solids component into said material, electrowinning said metal bearing solution, recovering said metal value from said metal bearing solution, and recycling iron into said material.

In various embodiments, a metal value recovery system is provided comprising a leaching apparatus, a solid-liquid separator in communication with the leaching apparatus, a first recycle feed configured to recycle pyrite from the solid-liquid separator to the leaching apparatus, an electrowinning cell comprising at least one cathode and at least one flow through anode, the electrowinning cell is configured to oxidize ferrous iron to ferric iron at the at least one flow through anode, the electrowinning cell configured to recovery a metal value on the at least one cathode, the electrowinning cell in communication with the solid-liquid separator, and a second recycle feed configured to recycle the ferric iron from the electrowinning cell to the leaching apparatus.

BRIEF DESCRIPTION OF THE DRAWINGS

A more complete understanding of the present invention, however, may best be obtained by referring to the detailed description when considered in connection with the drawing figures, wherein like numerals denote like elements and wherein.

DETAILED DESCRIPTION OF EXEMPLARY EMBODIMENTS

This detailed description of exemplary embodiments shows various exemplary embodiments of the invention known to the inventors at this time. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those of reasonable skill in the art. Additionally, all included figures are non-limiting illustrations of the exemplary embodiments and modes, which similarly avail themselves to any equivalent modes or embodiments that are known or obvious to those of reasonable skill in the art.

Aspects of various embodiments may provide significant advancements over prior art processes, particularly with regard to process efficiency and economics. Moreover, existing copper recovery processes that utilize conventional electrowinning process sequences may, in many instances, easily be retrofitted to exploit the many commercial benefits the present invention provides.

Figure 1:
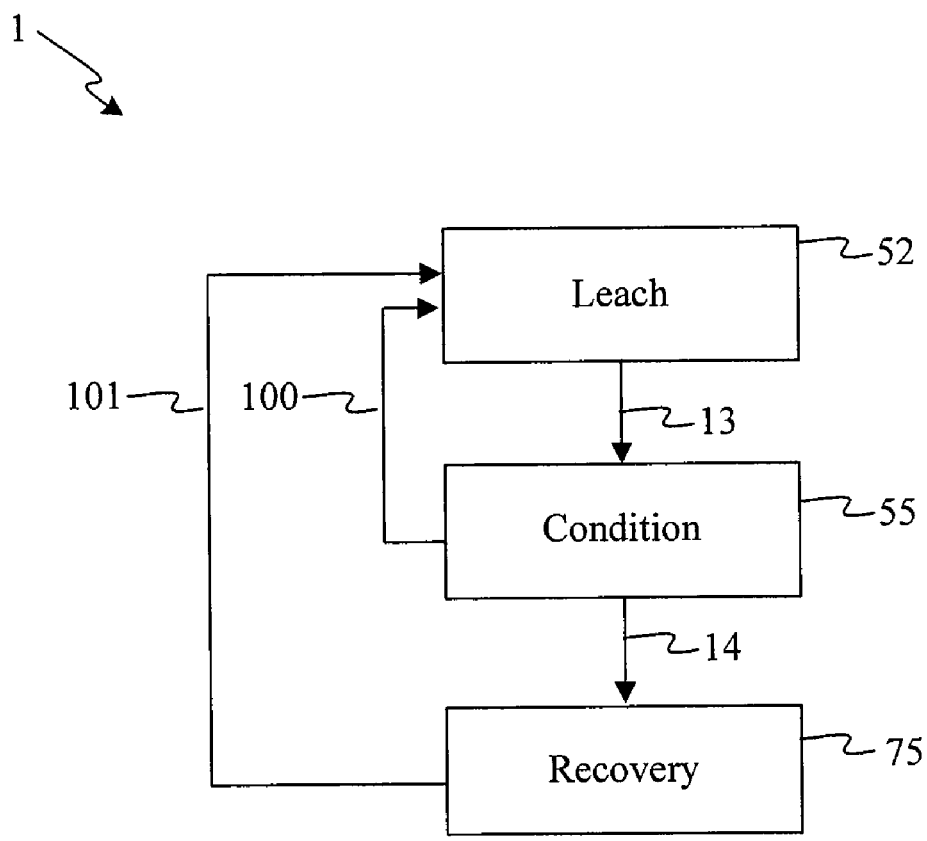
FIG. 1 illustrates a flow diagram illustrating a process in accordance with an exemplary embodiment of the present invention.

With reference to FIG. 1, a metal recovery process is illustrated according to various embodiments of the present invention. Metal recovery process 1 comprises leach step 52, conditioning step 55, recovery step 75, ferric iron recycle 101, and ferrous iron recycle 100. Leach step 52 can be any method, process, or system that enables a metal value to be leached from a metal bearing material. Typically, leach step 52 utilizes acid to leach a metal value from a metal bearing material. For example, leach step 52 can employ a leaching apparatus such as for example, a heap leach, a vat leach, a tank leach, a pad leach, a leach vessel or any other leaching technology useful for leaching a metal value from a metal bearing material. In accordance with various embodiments, leach step 52 may be conducted at any suitable pressure, temperature, and/or oxygen content. Leach step 52 can employ one of a high temperature, a medium temperature, or a low temperature, combined with one of high pressure, or atmospheric pressure. Leaching step 52 may utilize conventional atmospheric or pressure leaching, for example but not limited to, low, medium or high temperature pressure leaching. As used herein, the term "pressure leaching" refers to a metal recovery process in which material is contacted with an acidic solution and oxygen under conditions of elevated temperature and pressure. Medium or high temperature pressure leaching processes for chalcopyrite are generally thought of as those processes operating at temperatures from about 120° C. to about 190° C. or up to about 250° C. In accordance with, an exemplary embodiment, leach step 52 enables leaching of at least a copper value and an iron value from a chalcopyrite/pyrite ore or a chalcopyrite/pyrite concentrate.

In accordance with a preferred embodiment of the present invention, and as will be described in greater detail hereinbelow, leach step 52 preferably comprises a conventional atmospheric leaching operation.

In various embodiments, leach step 52 provides a metal bearing slurry 13 for condition step 55. In various embodiments, condition step 55 can be for example, but is not limited to, a solid liquid phase separation step, an additional leach step, a pH adjustment step, a dilution step, a concentration step, a metal precipitation step, a filtering step, a settling step, and the like, as well as combinations thereof. In an exemplary embodiment, condition step 55 can be a solid liquid phase separation step configured to yield a metal bearing solution 14 and a metal bearing solid. In an aspect of this exemplary embodiment, metal bearing solution 14 can comprise a copper value and ferrous iron ($Fe^{2+}$). In an aspect of this exemplary embodiment, a metal bearing solid can comprise ferrous iron, and in a preferred aspect, the ferrous iron can be in the form of pyrite or incompletely leached chalcopyrite.

In other various embodiments, condition step 55 may be one or more leaching steps. For example, condition step 55 may be any method, process, or system that further prepares metal bearing material for recovery. In various embodiments, condition step 55 utilizes acid to leach a metal value from a metal bearing material. For example, condition step 55 may employ a leaching apparatus such as for example, a heap leach, a vat leach, a tank leach, a pad leach, a leach vessel or any other leaching technology useful for leaching a metal value from a metal bearing material.

In accordance with various embodiments, condition step 55 may be a leach process conducted at any suitable pressure, temperature, and/or oxygen content. In such embodiments, condition step 55 may employ one of a high temperature, a medium temperature, or a low temperature, combined with one of high pressure, or atmospheric pressure. Condition step 55 may utilize conventional atmospheric or pressure leaching, for example but not limited to, low, medium or high temperature pressure leaching. Medium or high temperature pressure leaching processes for chalcopyrite are generally thought of as those processes operating at temperatures from about 120° to about 190° C. or up to about 250° C.

In various embodiments, condition step 55 may comprise dilution, settling, filtration, solution/solvent extraction, ion exchange, pH adjustment, chemical adjustment, purification, concentration, screening, and size separation. In various embodiments, condition step 55 is a high temperature, high pressure leach. In other embodiments, condition step 55 is an atmospheric leach. In further embodiments, condition step 55 is a solid liquid phase separation. In still further embodiments, condition step 55 is a settling/filtration step. In such embodiments, depending on the ore body used, pyrite and chalcopyrite may be heavier and/or larger than the other constituent particles, enabling a settling/filtration/screening step to select for at least a portion of pyrite and chalcopyrite contained in a solid phase.

In various embodiments, ferrous iron recycle 100 can be configured to transfer at least a portion of metal bearing solid comprising ferrous iron from condition step 55 to leach step 52. Ferrous iron recycle 100 recycles a portion of ferrous iron that was not leached into metal bearing solution 14. In an aspect of the present invention, the ferrous iron that is recycled back to leach step 52 can include iron that is still trapped in metal bearing solid, for example pyrite. In an exemplary embodiment, the ferrous iron that is recycled back to leach step 52 can be exposed to an acid to leach the recycled ferrous iron into a solution. In an exemplary embodiment, ferrous iron may be added to leaching step 52 by recycling ferrous iron from condition step 55 downstream of leaching step 52. Preferably, in an exemplary embodiment of this invention, the ferrous iron species is pyrite, most preferably, such pyrite comprises pyrite recycled from a solid/liquid phase separation stage after leaching step 52.

With further reference to FIG. 1, metal bearing solution 14 is suitably treated in recovery step 75 to advantageously enable the recovery of a metal value, such as, for example, a copper value. In one exemplary embodiment, recovery step 75 comprises direct electrowinning. In another exemplary embodiment, recovery step 75 comprises a solvent extraction and electrowinning. In various embodiments, recovery step 75 can employ an electrowinning step configured to cause the ferrous/ferric ($Fe^{2+}/Fe^{3+}$) couple to become the anode reaction, which as used herein, can be referred to as the alternative anode reaction ("AART"). In so doing, the ferrous/ferric anode reaction replaces the decomposition of water anode reaction. Because oxygen gas is not produced in the ferrous/ferric anode reaction, the generation of "acid mist" as a result of the reactions in the electrochemical cell can be eliminated. In addition, because the equilibrium potential of the $Fe^{2+}/Fe^{3+}$ couple (i.e., $E^0=-0.770$ V) is less than that for the decomposition of water (i.e., $E=-1.230$ V), the cell voltage is decreased, thereby decreasing cell energy consumption. Furthermore, in accordance with one aspect of the invention, ferrous iron can be created in leach step 52 and used in the ferrous/ferric electrowinning anode reaction in recovery step 75.

The alternative anode reaction ("AART") as well as general cell configurations, operating parameters and flow and cell characteristics of such process which may be employed in connection with various embodiments and aspects of the present invention are, for the purpose of clarity, discussed in greater detail hereinbelow. As such, it should be appreciated that as used in connection with the following description of the exemplary embodiments made with reference to the drawing figures the AART process referred to is that which is more fully described hereinbelow.

Further with reference to FIG. 1, in accordance with a preferred embodiment of the invention, ferric iron recycle 101 can be configured to permit ferric iron ($Fe^{3+}$) generated in recovery step 75 to be recycled to leach step 52. In this manner, ferric iron from ferric iron recycle 101 can be reduced to ferrous iron in leach step 52. This improved process and apparatus disclosed herein achieves an advancement in the art by producing increased amounts of ferrous iron in the leached product slurry, thereby allowing for electrowinning with a ferrous/ferric anode reaction process.

As leaching step 52 consumes ferric iron by reducing ferric iron to ferrous iron, in accordance with various aspects of the present invention, leaching step 52 may be used to reduce the ferrous iron needed for downstream recovery step 75, such as for example, through use of an electrowinning cell configured for AART. As noted above, for clarity, exemplary embodiments of an electrowinning cell and the various parameters associated therewith configured for AART are described in detail below. Synergistically, ferric iron produced from the AART may be recycled into leach step 52 for reduction to ferrous iron. For example, ferric iron recycle 101 illustrates the flow of ferric iron into leach step 52 so that ferric iron may be reduced to ferrous iron.

Figure 2:
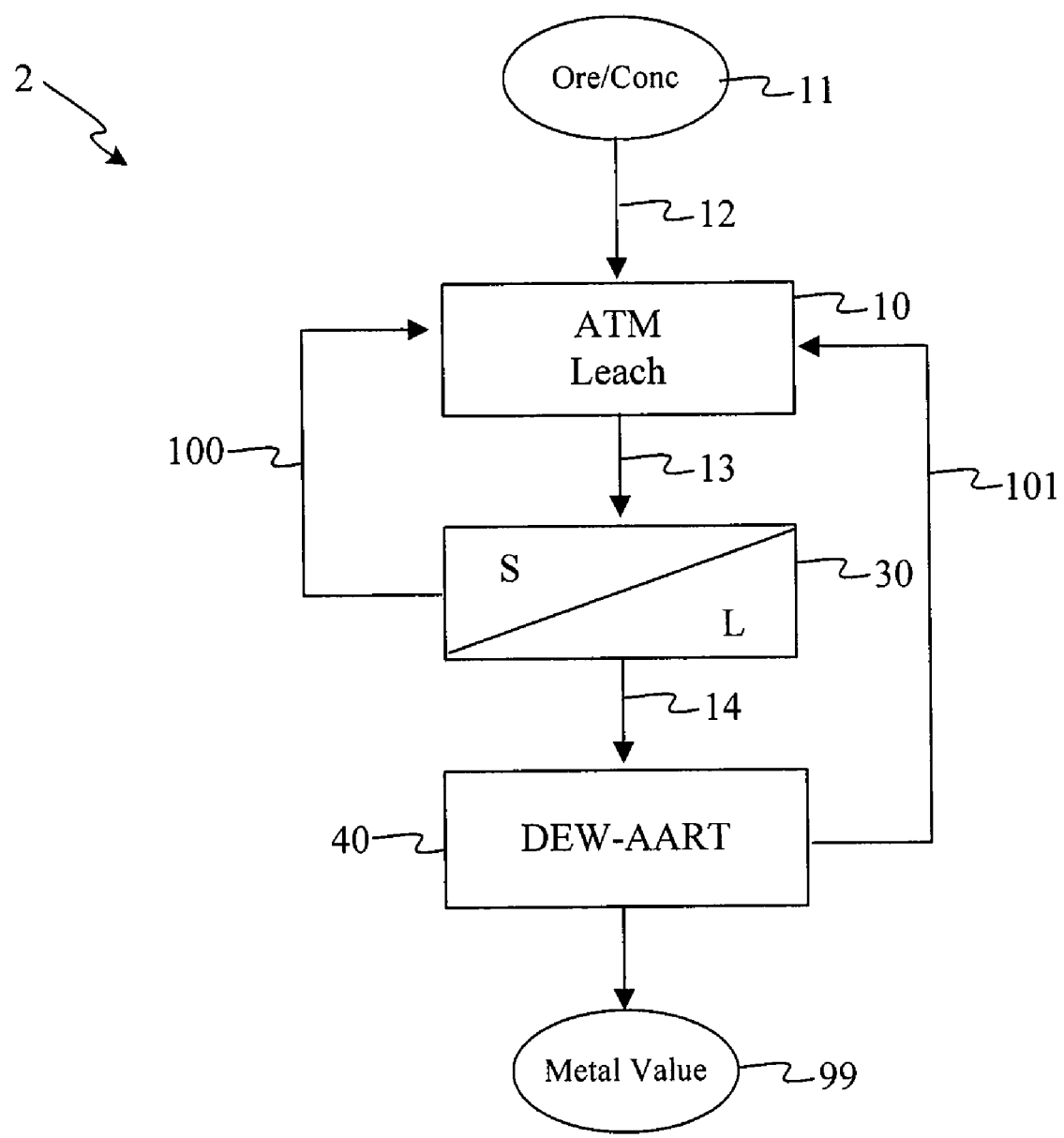
FIG. 2 illustrates a flow diagram illustrating a process in accordance with an exemplary embodiment of the present invention.

With reference now to FIG. 2, metal recovery process 2 is illustrated in accordance with an exemplary embodiment of the present invention. Metal-bearing material 11 may be an ore, a concentrate, or any other material from which metal values may be recovered. Metal values such as, for example, copper, gold, silver, zinc, platinum group metals, nickel, cobalt, molybdenum, rhenium, uranium, rare earth metals, and the like may be recovered from a metal-bearing material 11 in accordance with various embodiments of the present invention. Various aspects and embodiments of the present invention, however, prove especially advantageous in connection with the recovery of copper from copper sulfide ores, such as, for example, chalcopyrite ($CuFeS_2$), chalcocite ($Cu_2S$), bornite ($CuSFeS_4$), and covellite ($CuS$). Thus, metal-bearing material 11 may be a copper ore or concentrate, and preferably, is a copper sulfide ore or a concentrate. Various aspects and embodiments of the present invention, however, prove especially advantageous in connection with the recovery of copper and gold from gold bearing copper sulfide ores, such as, for example, gold bearing chalcopyrite ($CuFeS_2$), chalcocite ($Cu_2S$), bornite ($CuSFeS_4$), and covellite ($CuS$). Thus, metal-bearing material 11 may be a gold-bearing copper ore or concentrate, and preferably, is a gold-bearing copper sulfide ore or a concentrate.

Metal-bearing material 11 may be prepared for leaching step 10 in any manner that enables the conditions of metal-bearing material 11 such as, for example, particle size, composition, and component concentration to be suitable for the chosen processing method, as such conditions may affect the overall effectiveness and efficiency of processing operations. Desired composition and component concentration parameters can be achieved through a variety of chemical and/or physical processing stages, the choice of which will depend upon the operating parameters of the chosen processing scheme, equipment cost and material specifications. For example, metal-bearing material 11 may undergo comminution, fine grinding, flotation, blending, and/or slurry formation, as well as any chemical and/or physical conditioning including, but not limited to metal precipitation and/or a solid/liquid phase separation step. As used herein, metal bearing material 11 may be interchangeably referred to as ore or concentrate. In various embodiments, metal bearing material can comprise at least one metal value and pyrite.

In various aspects of this embodiment of the present invention, metal bearing material 11 is moved to leach step 10 via metal bearing stream 12. In various embodiments, leach step 10 is conducted at near about atmospheric pressure (i.e., 1 atm or 101.3 kPa). Such a leaching apparatus useful for leach step 10 may be, for example but not limited to, a heap leach, a vat leach, a tank leach, a pad leach, a simultaneous grind/leach, or any other similar operation. In an exemplary embodiment, the leach step 10 can be performed using oxides of metal values. In an exemplary embodiment, ferric sulfate media may be used.

In accordance with one preferred embodiment of the present invention, atmospheric leach step 10 may be carried out under conditions whereby the pyrite is not materially oxidized. For example, leach step 10 may include the application of an oxidizing agent, e.g. oxygen in the form of air or $O_2$ gas. Typically, the operating solution potential of the atmospheric leach step 10 is less than about 500 mV (with reference to Ag/AgCl electrode), preferably, between about 350 mV and 520 mV and more preferably between about 380 mV and 480 mV.

In various embodiments, atmospheric leach step 10 includes a bulk concentrate containing a chalcopyrite:pyrite ratio of between about 3:1 and about 1:20 is subjected to the leaching process. Alternatively, the chalcopyrite:pyrite ratio is between about 1:1 and about 1:10, or between about 1:2 and about 1:4. In exemplary embodiment, the chalcopyrite:pyrite ratio is between about 1:4. Additional pyrite may be added.

Leach step 10 may be performed at temperatures between about 50° C. and about 250° C. In various embodiments, leach step 10 may be performed at temperatures between about 190° C. and about 250° C. In other embodiments, leach step 10 may be performed at temperatures between about 120° C. and 190° C. In still other embodiments, leach step 10 may be performed at temperatures between about 50° C. and about 120° C., although a temperature of about 60° C. and about 90° C. is preferable. In various embodiments, a leach step 10 is performed under about atmospheric pressure.

In accordance with one aspect of the present invention, atmospheric leach step 10 may include ferric iron among the metal values to be processed. As discussed above, it is advantageous to use a leach step, exemplified in FIG. 2 as atmospheric leaching step 10, which produces ferrous iron to allow for electrowinning of the copper value utilizing a ferrous/ferric anode reaction process. Thus, in accordance with this exemplary embodiment of the present invention, ferrous iron recycle 100 can be configured to recycle ferrous iron to atmospheric leaching step 10 to increase the production of ferrous iron in the metal bearing slurry 13 from the atmospheric leaching step 10.

The solid liquid phase separation step 30 is suitably configured to separate metal slurry 13 into a metal bearing solution 14 and a metal bearing solid comprising ferrous iron. In an exemplary embodiment, metal bearing slurry 14 comprises a metal value, such as for example a copper value and ferrous iron. Preferably, at least a portion of metal bearing solid comprising ferrous iron is transferred via ferrous iron recycle 100 to atmospheric leach step 10. In an exemplary embodiment, ferrous iron may be added to atmospheric leaching step 10 by recycling ferrous iron from solid-liquid phase separation step 30 of the atmospheric leaching step 10. Preferably, in an exemplary embodiment of this invention, the ferrous iron species is pyrite, most preferably, pyrite which is recycled from a solid/liquid phase separation stage 30 after atmospheric leaching step 10.

In various embodiments, a metal value 99 can be recovered from metal bearing solution 14 by direct electrowinning step 40 configured to utilize AART. In an exemplary embodiment, metal value 99 can be copper. In various embodiments, ferric iron is recycled from direct electrowinning step 40 to increase the production of ferrous iron in the product slurry from an atmospheric leaching step 10. As atmospheric leaching step 10 consumes ferric iron by reducing ferric iron to ferrous iron, atmospheric leaching step 10 may be used to reduce the ferrous iron needed for downstream direct electrowinning step 40 that utilize AART. Synergistically, ferric iron produced in the AART reaction may be recycled into atmospheric leach step 10 for reduction to ferrous iron. For example, ferric iron recycle 101 illustrates the flow of ferric iron into an atmospheric leach step 10 so that ferric iron may be reduced to ferrous iron. Also in accordance with exemplary embodiments, ferric iron is recycled from direct electrowinning step 40 to increase the production of ferrous iron in the metal bearing slurry 13 from the atmospheric leaching step 10.

Figure 3:
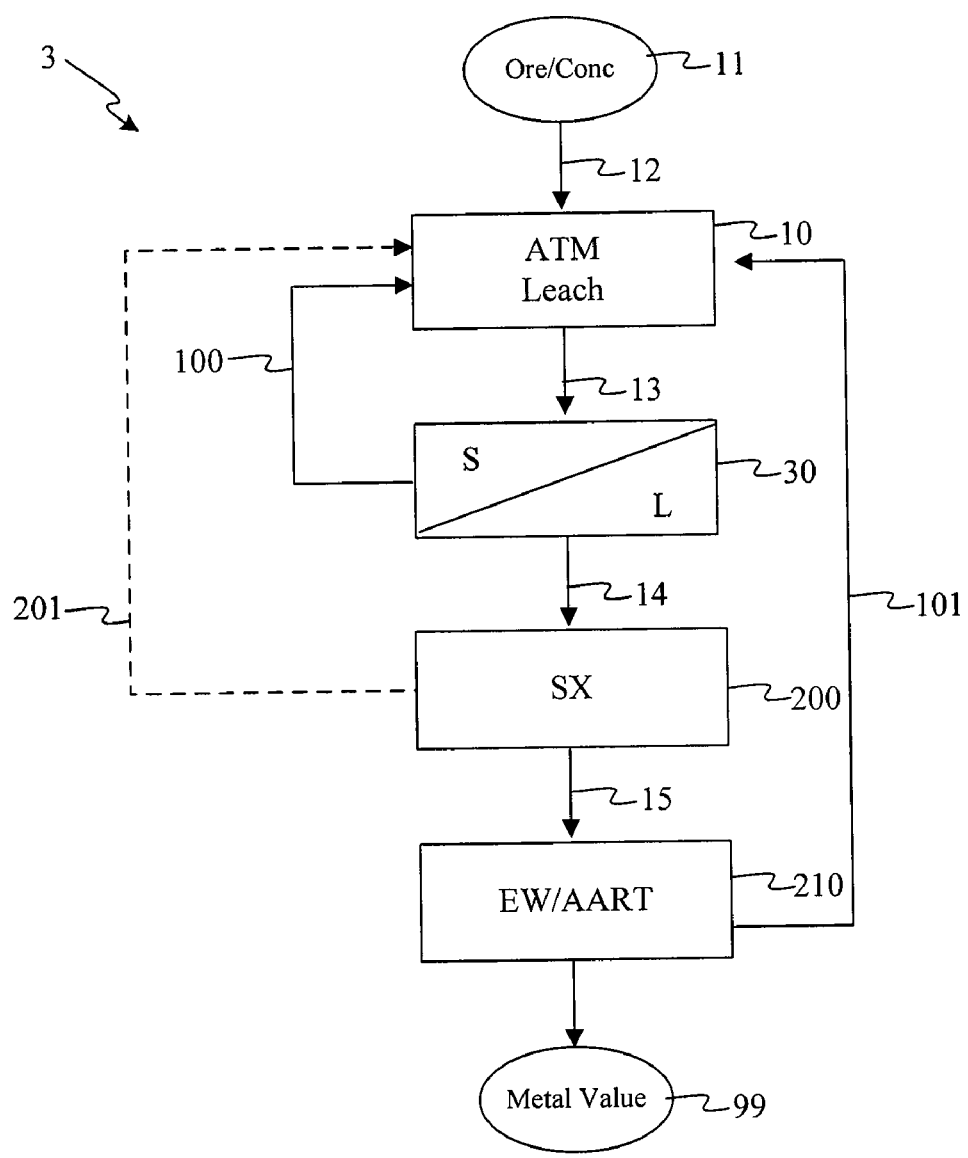
FIG. 3 illustrates a flow diagram illustrating a process in accordance with an exemplary embodiment of the present invention.

With reference now to FIG. 3, metal recovery process 3 is illustrated in accordance with an exemplary embodiment of the present invention. As illustrated in FIG. 3, metal bearing material 11, metal bearing stream 12, atmospheric leach step 10, metal bearing slurry 13, solid-liquid phase separation step 30, ferrous iron recycle 100, metal bearing solution 14 and ferric iron recycle 101 are as described hereinabove.

However, in accordance with this exemplary embodiment of the present invention, metal-bearing solution 14 from solid-liquid phase separation step 30 may be further processed in a solvent extraction step 200. In accordance with various aspects of this embodiment of the present invention, solvent extraction step 200 can be configured to selectively extract both a metal value, such as for example copper, and ferrous iron. During solvent extraction step 200, a metal value, such as for example copper, from metal bearing solution may be loaded selectively onto an organic chelating agent, for example, an aldoxime/ketoxime blend, resulting in a metal value containing organic stream and a raffinate solution 201. In various embodiments, the metal value containing organic stream may comprise a copper compound and ferrous iron. Solvent extraction step 200 can be configured to select for both a metal value, such as copper, and ferrous iron by the selection of an appropriate mixture of ketoximes and/or aldoximes. Solvent extraction step 200 can produce a raffinate solution 201 and a rich electrolyte 15. In various embodiments, solvent extraction step 200 can yield a rich electrolyte 15 comprising a metal value and ferrous iron.

Raffinate 201 from solvent extraction step 200 advantageously may be used in a number of ways. For example, all or a portion of raffinate 201 may be recycled to atmospheric leaching step 100, such as for example to aid with temperature control or solution balancing, or it may be used in other leaching operations, or it may be used for any combination thereof. The use of raffinate 201 in atmospheric leaching step 10 may be beneficial because the acid and ferric/ferrous iron values contained in raffinate 201 may act to optimize the potential for leaching oxide and/or sulfide ores that commonly dominate heap leaching operations. That is, any ferric iron and acid remaining in raffinate 201 may be used to optimize the Eh and/or pH of atmospheric leaching step 10. It should be appreciated that the properties of raffinate 201, such as component concentrations, may be adjusted in accordance with the desired use of raffinate 201.

In various embodiments, a metal value 99 can be recovered from rich electrolyte 15 by electrowinning step 210 configured to utilize AART. In an exemplary embodiment, metal value 99 can be copper. In various embodiments, ferric iron is recycled from electrowinning step 210 to increase the production of ferrous iron in the product slurry from an atmospheric leaching step 10. As the atmospheric leaching step 10 consumes ferric iron by reducing ferric iron to ferrous iron, the atmospheric leaching step 10 may be used to reduce the ferrous iron needed for downstream electrowinning step 210 that utilize AART. Synergistically, ferric iron produced from the AART reaction may be recycled into an atmospheric leach step 10 for reduction to ferrous iron. For example, ferric iron recycle 101 illustrates the flow of ferric iron into an atmospheric leach step 10 so that ferric iron may be reduced to ferrous iron. Also in accordance with exemplary embodiments, ferric iron is recycled from electrowinning step 210 to increase the production of ferrous iron in the metal bearing slurry 13 from the atmospheric leaching step 10.

Figure 4:
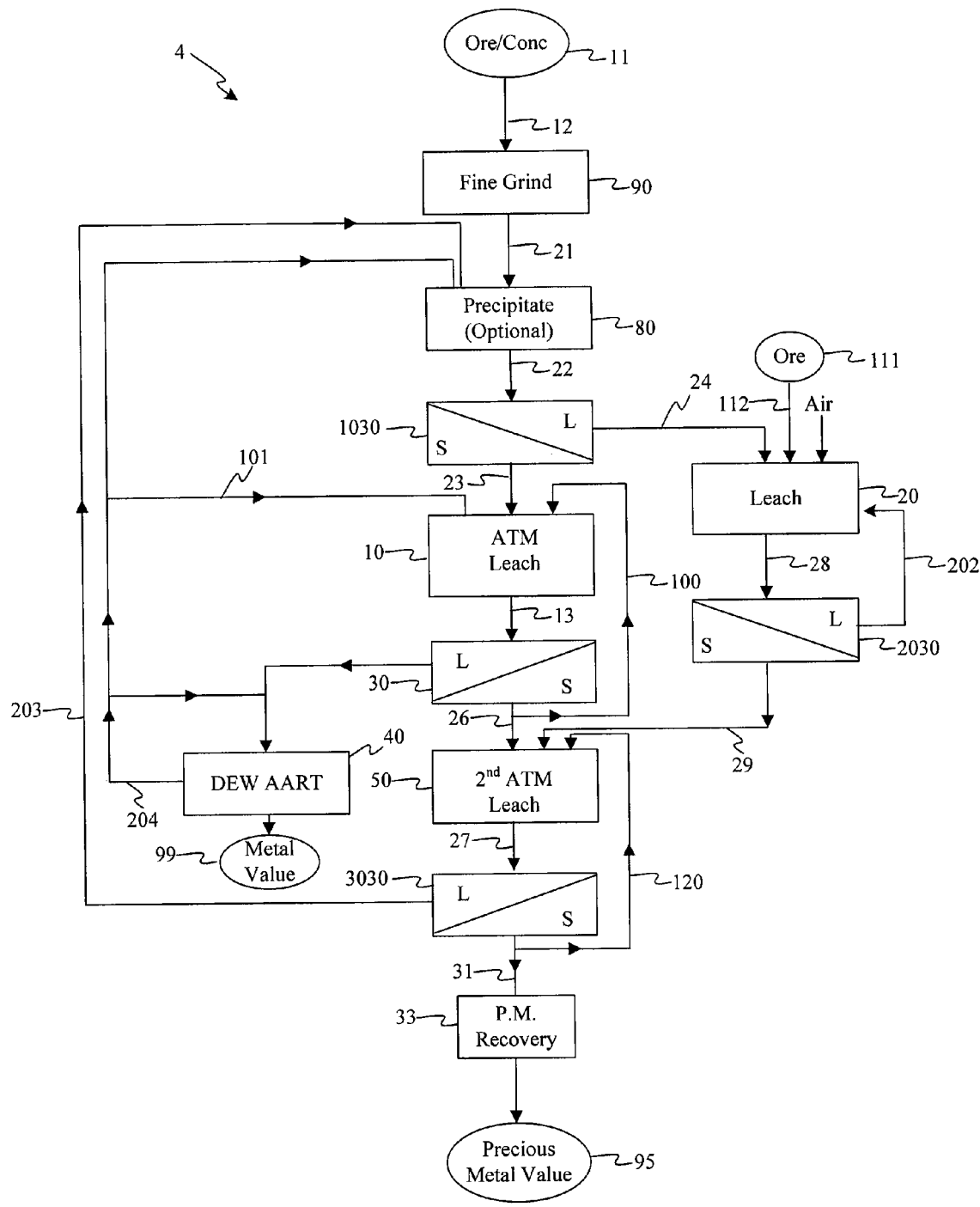
FIG. 4 illustrates a flow diagram illustrating a process in accordance with an exemplary embodiment of the present invention.

As illustrated in FIG. 4, metal recovery process 4 can be configured for recovery of a metal value and a precious metal value, in accordance with another exemplary embodiment of the present invention. As illustrated in FIGS. 2 and 3, metal bearing material 11, metal bearing stream 12, atmospheric leach step 10, metal bearing slurry 13, solid-liquid phase separation step 30, ferrous iron recycle 100, metal bearing solution 14 and ferric iron recycle 101 are as previously described above.

Hydrometallurgical processes, particularly pressure leaching processes, may be sensitive to the particle size of the metal bearing material to be treated, such as for example metal bearing material 11. Thus, it is in the area of extractive hydrometallurgy it may be desirable to finely divide, grind, and/or mill mineral species to reduce particle sizes prior to leaching. It generally has been appreciated that reducing the particle size of a mineral species, such as, for example, a copper sulfide, enables leaching, such as for example pressure leaching, under less extreme conditions of pressure and temperature to achieve the same metal extraction as achieved under conditions of higher temperature and pressure. The particle size distribution can also affect other leaching conditions, such as, for example, acid concentration and oxygen overpressure.

A variety of acceptable techniques and devices for reducing the particle size of the metal-bearing material are currently available, such as ball mills, tower mills, superfine grinding mills, attrition mills, stirred mills, horizontal mills and the like, and additional techniques may later be developed that may achieve the desired result of increasing the surface area of the material to be processed.

For example, metal-bearing material 11 may be prepared for metal recovery processing by controlled fine grinding. Preferably, it is advantageous not only to reduce the size of the metal-bearing material 11 particles in the process stream, but also to ensure that the weight proportion of the coarsest particles is minimized. Significant advantages in processing efficiency and copper recovery are achievable by enabling substantially all particles to react substantially completely. In exemplary embodiments, fine grinding step 90 preferably results in metal bearing material 11 being finely ground, such that the particle size of the metal bearing material 11 being processed is reduced such that substantially all of the particles are small enough to react substantially completely during leaching.

Ground metal bearing material 21 can comprise various particle sizes and particle size distributions may be advantageously employed in accordance with various aspects of the present invention. For example, in accordance with one aspect of the present invention grinding step 90 results in metal bearing material 11 being finely ground to a P80 on the order of less than about 25 microns, and preferably on the order of a P80 between about 13 and about 20 microns. In accordance with another aspect of the present invention, the copper-containing material has a P80 of less than about 250 microns, preferably a P80 from about 75 to about 150 microns, and more preferably a P80 on the order of from about 5 to about 75 microns. In accordance with yet another aspect of the present invention, a particle size distribution of approximately 98 percent passing about 25 microns is preferable, and more preferably, the metal-bearing material stream has a particle size distribution of approximately 98 percent passing from about 10 to about 23 microns, and optimally from about 13 to about 15 microns.

Fine grinding step 90 may be conducted in any manner, satisfactory controlled fine grinding may be achieved using a fine grinding apparatus, such as, for example, a stirred horizontal shaft mill with baffles or a vertically stirred mill without baffles. Such exemplary apparatus include the Isamill developed jointly by Mount Is a Mines (MIM), Australia, and Netzsch Feinmahltechnik, Germany and the SMD or Detroit Mill, manufactured by Metso Minerals, Finland. Preferably, if a horizontal mill is utilized, the grinding medium would be 1.2/2.4 mm or 2.4/4.8 mm Colorado sand, available from Oglebay Norton Industrial Sands Inc., Colorado Springs, Colo. However, any grinding medium that enables the desired particle size distribution to be achieved may be used, the type and size of which may be dependent upon the application chosen, the product size desired, grinding apparatus manufacturer's specifications, and the like. Exemplary media include, for example, sand, silica, metal beads, ceramic beads, and ceramic balls.

In various embodiments, ground metal bearing material 21 can optionally be subjected to a separation step, such as, for example, a precipitation step 80 shown in FIG. 4, which, in accordance with this exemplary process, serves to precipitate solubilized metal value from a recycled lean electrolyte stream 204 onto the surfaces of solid particles in the ground metal bearing slurry 22. In an exemplary embodiment, precipitation step 80 can involve ground metal bearing material 21 being combined with a sulfur dioxide ($SO_2$) stream, lean electrolyte stream 204, and/or recycled liquid phase 203 in a suitable processing vessel. Preferably, precipitation step 80 is carried out such that the metal value from the lean electrolyte 204 precipitates, at least in part, onto the surface of ground metal bearing slurry 22. Optional precipitation step 80 can be carried out at a slightly elevated temperature, such as from about 70° C. to about 180° C., preferably from about 80° C. to about 100° C., and most preferably at a temperature of about 90° C. Heating, if necessary, can be effectuated through any conventional means, such as electric heating coils, a heat blanket, process fluid heat exchange, external exothermic reaction, and other ways now known or later developed. In an exemplary process, steam may be generated in other process areas, and may be directed to the processing vessel in optional precipitation step 80 to provide the heat desired to enhance the precipitation process.

In exemplary embodiments, optional precipitation step 80 produces ground metal bearing slurry 22, which can be processed by solid liquid phase separation 1030. Solid liquid phase extraction 1030 may be similar to solid liquid phase separation step 30 as described hereinabove. Solid liquid phase separation step 1030 yields a rough metal bearing solution 24 and a rough metal bearing solid 23. Rough metal bearing solid 23 can be processed by atmospheric leaching step 10 to yield metal bearing slurry 13. Solid liquid phase separation step 30 can be configured to separate metal bearing slurry 13 into metal bearing solution 14 and metal bearing solid 26, as described herein. In accordance with this exemplary embodiment, metal bearing solution 14 is advantageously processed by a direct electrowinning step 40 to yield a metal value 99. Direct electrowinning step 40 may be configured with AART, as described hereinabove. Lean electrolyte 204 from direct electrowinning step 40 can be recycled to precipitation step 80, or recycled and mixed with metal bearing solution 14 and/or recycled as ferric iron recycle 101 back into atmospheric leaching step 10. As described herein, atmospheric leaching step 10 can reduce ferric iron from ferric iron recycle 101 into ferrous iron.

Moving back to solid liquid phase separation step 30, metal bearing solid 26 may be split such that at least a portion of metal bearing solid 26 may provide ferrous iron to atmospheric leaching step 10 via ferrous iron recycle 100. The remainder and/or at least a portion of metal bearing solid 26 may be added to second atmospheric leaching step 50. In various embodiments, second atmospheric leaching step 50 can utilize any leaching process described herein. In an aspect of the exemplary embodiments, atmospheric leaching step 50 can be configured to conditions as described herein for atmospheric leaching step 10.

Moving to solid liquid phase separation step 1030, in accordance with various aspects of this exemplary embodiment, rough metal bearing solution 24 may be added to a leaching step 20. Leaching step 20 may be any leaching process described herein. In accordance with one aspect of this exemplary embodiment, leaching step 20 may include the addition of air or oxygen to help facilitate leaching. Second metal bearing material 111 may be added to leach step 20. In various embodiments, second metal bearing material 111 may be equivalent to metal bearing material 11 described herein. Second metal bearing material 111 may be transferred to leach step 20 via second metal bearing material stream 112.

In exemplary embodiments, leach step 20 can yield slurry 28. Second solid liquid phase separation step 2030 can be configured to process slurry 28 to yield solid portion 29 and liquid portion 202. In accordance with one aspect of this exemplary embodiment, solid portion 29 may be added to second atmospheric leach step 50, and liquid portion 202 from solid liquid phase separation step 2030 may be recycled to leach step 20. In various aspects of this exemplary embodiment, second atmospheric leach step 50 can yield a precious metals slurry 27. In such case, solid liquid phase separation step 3030 can process precious metal slurry 27 into a recyclable liquid phase 203 and a precious metals residue 31. A portion of precious metal residue 31 may be recycled back to second atmospheric leach step 50 via precious metal recycle 120. Precious metal residue can be processed by precious metal recovery step 33 to recover precious value 95. Precious metal recovery step 33 can be electrowinning, ion exchange, electrorefining and/or any other recovery process useful for the recovery of a precious metal. Precious metal value can be for example but not limited to gold, silver, nickel, rhenium, or molybdenum, and is preferably gold.

Depending on its composition, precious metal residue 31 from solid liquid phase separation step 3030 may be disposed of or subjected to further processing, such as, for example, precious metal recovery. For example, if precious metal residue 31 contains an economically significant fraction of gold, it may be desirable to recover this gold fraction through a cyanidation process or other suitable recovery process. If gold or other precious metals are to be recovered from precious metal residue 31 by cyanidation techniques, the content of contaminants in the stream, such as elemental sulfur, iron precipitates, and unreacted copper minerals, is preferably minimized. Such materials generally promote high reagent consumption in the cyanidation process and thus increase the expense of the precious metal recovery operation. Additionally, as mentioned above, it is preferable to use a large amount of wash water or other diluent during the solid-liquid separation process to maintain low copper and acid levels in the CCD residue in an attempt to optimize the residue stream conditions for precious metal recovery.

Figure 5:
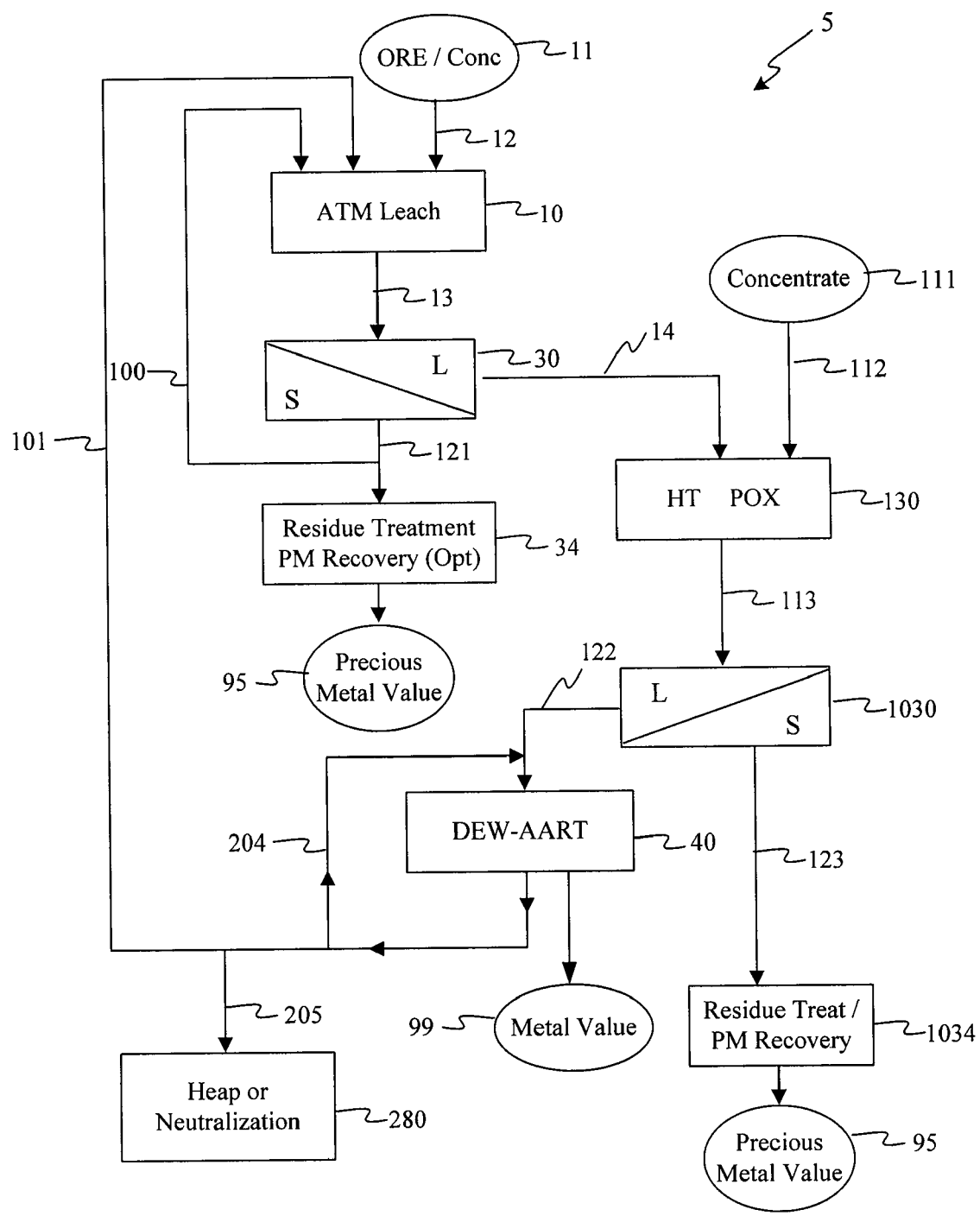
FIG. 5 illustrates a flow diagram illustrating a process in accordance with an exemplary embodiment of the present invention.

As illustrated in FIG. 5, metal recovery process 5 can be configured for recovery of a metal value and a precious metal value, in accordance with an exemplary embodiment of the present invention. For the sake of brevity, as illustrated in FIGS. 2, 3, and 4, metal bearing material 11, metal bearing stream 12, atmospheric leach step 10, metal bearing slurry 13, solid-liquid phase separation step 30, ferrous iron recycle 100, metal bearing solution 14 and ferric iron recycle 101 are as described hereinabove. Also as illustrated in FIG. 4, second metal bearing material 111, second metal bearing material stream 112, and lean electrolyte 204 are as described hereinabove.

With reference to FIG. 5, solid-liquid phase separation step 30 can be configured to separate metal bearing slurry 13 into metal bearing solution 14 and a precious metal residue comprising ferrous iron 121. In exemplary embodiments, a first portion of precious metal residue comprising ferrous iron 121 can be recycled to atmospheric leach step 10 via ferrous iron recycle 100. In exemplary embodiments, a second portion of precious metal residue comprising ferrous iron 121 can be process by residue treatment step 34 and optionally by precious metal recovery step to yield precious metal value 95. Precious metal recovery step and precious metal 95 have been described in detail above.

In exemplary embodiments, a first portion of metal bearing solution 14 can be combined with second metal bearing material 111 and the combination can be processed by high temperature pressure leaching step 130. In various embodiments, high temperature pressure leaching step 130 may be configured to utilize a pressure leaching vessel preferably in a manner suitably selected to promote the solubilization of the metal value to be recovered, such as for example copper and/or a precious metal value. Various parameters may influence the high temperature pressure leaching process. For example, during pressure leaching, it may be desirable to introduce materials to enhance the pressure leaching step 130. In accordance with one aspect of the present invention, during pressure leaching in the pressure leaching vessel, sufficient oxygen may be injected into the vessel to maintain an oxygen partial pressure from about 50 to about 200 psi, preferably from about 75 to about 150 psi, and most preferably from about 100 to about 125 psi.

Furthermore, due to the nature of high temperature pressure leaching 130, the total operating pressure in the pressure leaching vessel is generally superatmospheric, preferably from about 250 to about 750 psi, more preferably from about 300 to about 700 psi, and most preferably from about 400 to about 600 psi. The residence time for the high temperature pressure leaching step 130 can vary, depending on factors such as, for example, the characteristics of the combination of metal bearing solution 14 and second metal-bearing material 111, as well as the operating pressure and temperature of the reactor. In one aspect of the invention, the residence time for the high temperature pressure leaching step can range from about 30 to about 120 minutes. In various embodiments, high temperature pressure leaching step 130 can produce a second metal bearing slurry 113.

Still referring to FIG. 5, second solid-liquid phase separation step 1030 can be configured to separate second metal bearing slurry 113 into second metal bearing solution 122 and a precious metal residue 123. In exemplary embodiments, a second portion of metal bearing solution 14 can be combined with second metal bearing solution 122. This combination can be configured to move an adequate amount of ferrous iron to an electrowinning step. In exemplary embodiments, precious metal residue 123 can be processed by second residue treatment step 1034, and, optionally, by precious metal recovery step 1034 to yield precious metal value 95. Precious metal recovery step 1034 and precious metal 95 have been described in detail hereinabove.

In various embodiments, a metal value 99 can be recovered from the combination of second portion of metal bearing stream 14 and second metal bearing solution 122 by a direct electrowinning step 40 preferably configured to utilize AART. In an exemplary embodiment, metal value 99 can be copper. In various embodiments, ferric iron is recycled from direct electrowinning step 40 to increase the production of ferrous iron in the product slurry from an atmospheric leaching step 10. As the atmospheric leaching step 10 consumes ferric iron by reducing ferric iron to ferrous iron, the atmospheric leaching step 10 may be used to reduce the ferrous iron needed for downstream direct electrowinning step 40 that utilize AART. As discussed herein, ferric iron produced from the AART reaction may be recycled into an atmospheric leach step 10 for reduction to ferrous iron. For example, ferric iron recycle 101 illustrates the flow of ferric iron into an atmospheric leach step 10 so that ferric iron may be reduced to ferrous iron. In an exemplary embodiment, lean electrolyte bleed 205 can be configured to provide lean electrolyte to other heap leach or neutralization processes 280.

Figure 6:
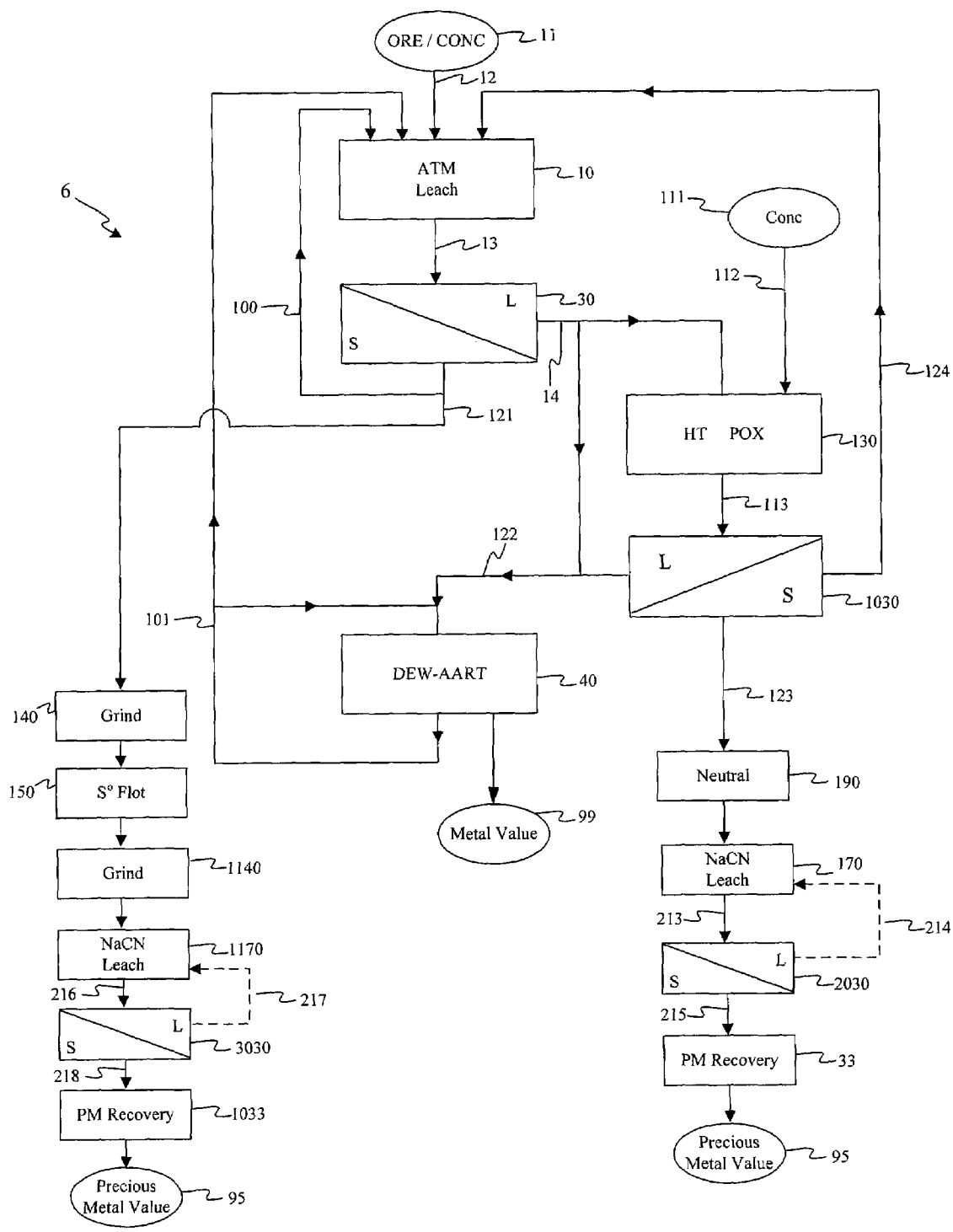
FIG. 6 illustrates a flow diagram illustrating a process in accordance with an exemplary embodiment of the present invention.

As illustrated in FIG. 6, metal recovery process 6 can be configured for recovery of a metal value and a precious metal value, in accordance with an exemplary embodiment of the present invention. For the sake of brevity, as illustrated in FIGS. 2, 3, 4, and 5 metal bearing material 11, metal bearing stream 12, atmospheric leach step 10, metal bearing slurry 13, solid-liquid phase separation step 30, ferrous iron recycle 100, metal bearing solution 14 and ferric iron recycle 101 are as described above. Also as illustrated in FIGS. 4 and 5 second metal bearing material 111, second metal bearing material stream 112, and lean electrolyte 204 are as described above. In addition, as illustrated in FIG. 5, high temperature pressure leach step 130, second metal bearing slurry 113, second solid-liquid phase separation step 1030, precious metal residue comprising ferrous iron 121, second metal bearing solution 122, precious metal residue 123, direct electrowinning step 40, and metal value 99 are as described above.

With further reference to FIG. 6, a second solid liquid phase separation step 1030 can be configured to produce second metal bearing solution 122, precious metal residue 123, and leach recycle stream 124. In exemplary embodiments, a portion of metal bearing solution 14 can be combined with second metal bearing solution 122. This combination can be configured to move an adequate amount of ferrous iron to an electrowinning step. In various embodiments, a metal value 99 can be recovered from the combination of second portion of metal bearing stream 14 and second metal bearing solution 122 by a direct electrowinning step 40 preferably configured to utilize AART. In an exemplary embodiment, metal value 99 can be copper. In various embodiments, ferric iron is recycled from direct electrowinning step 40 to increase the production of ferrous iron in the product slurry from an atmospheric leaching step 10.

In an exemplary embodiment, precious metal residue 123 can be subjected to a neutralization step 190 and then can be processed, such as by a cyanide leach step 170. The precious metal slurry 213 produced by cyanide leach step 170 may comprise gold. A third solid liquid phase separation step 2030 can be configured to separate precious metal slurry 213 into a precious metal solid 215 and a liquid portion 214. In an exemplary embodiment, precious metal solid 215 can be processed by precious metal processing step 33 to produce precious metal value 95. Precious metal recovery step 33 and precious metal 95 have been described in detail above.

Still referring to FIG. 6, a second portion of precious metal residue comprising ferrous iron 121 can be optionally subjected to a grinding step 140. In one aspect of this exemplary embodiment, grinding step 140 may be equivalent to fine grinding step 90. In another aspect of this exemplary embodiment, grinding step 140 produces an output material that is courser than that produced by fine grinding step 90. A ground precious metal residue comprising ferrous iron material can be subjected to a sulfur flotation step 150, such as, for example to facilitate removal of elemental sulfur. A second grinding step 1140 may be optionally utilized. Second grinding step 1140 may be equivalent to grinding step 140, and the ground and essentially sulfur-free precious metal residue may be processed by second cyanide leach step 1170. The second precious metal slurry 216 second produced by cyanide leach step 1170 may comprise gold. Solid liquid phase separation step 3030 can be configured to separate second precious metal slurry 216 into second precious metal solid 218 and second liquid portion 217. In an exemplary embodiment, second precious metal solid 218 can processed by second precious metal processing step 1033 to produce precious metal value 95. Second precious metal recovery step 1033 may be equivalent to precious metal recovery step 33, which along with precious metal 95 have been described in detail above.

Figure 7:
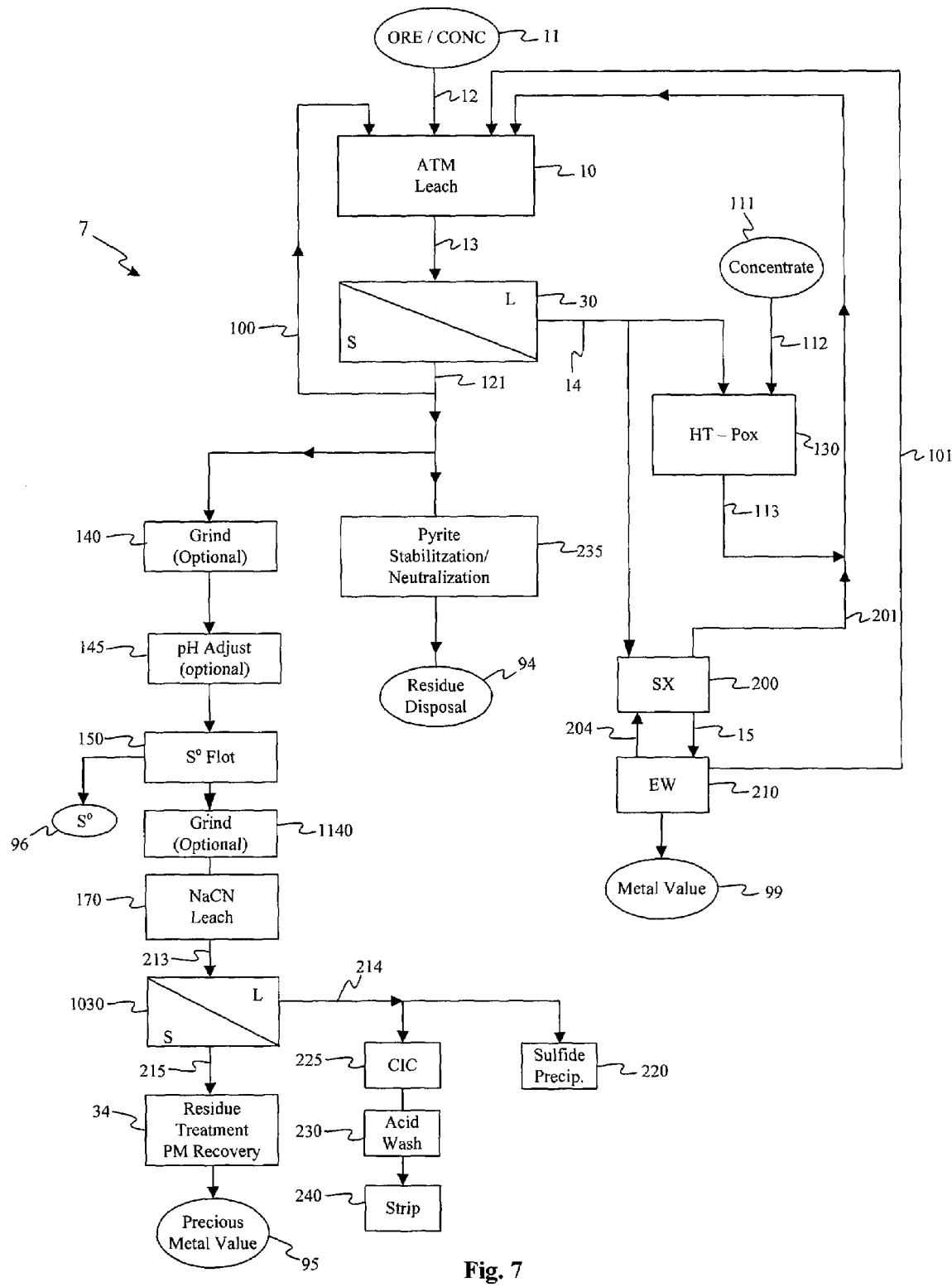
FIG. 7 illustrates a flow diagram illustrating a process in accordance with an exemplary embodiment of the present invention.

As illustrated in FIG. 7, metal recovery process 7 can be configured for recovery of a metal value and a precious metal value, in accordance with an exemplary embodiment of the present invention. For the sake of brevity, as illustrated in FIGS. 2, 3, 4, 5, and 6 metal bearing material 11, metal bearing stream 12, atmospheric leach step 10, metal bearing slurry 13, solid-liquid phase separation step 30, ferrous iron recycle 100, metal bearing solution 14 and ferric iron recycle 101 are as described above. Also as illustrated in FIGS. 4 and 5 second metal bearing material 111, second metal bearing material stream 112, and lean electrolyte 204 are as described above. In addition, as illustrated in FIGS. 5 and 6, high temperature pressure leach step 130, second metal bearing slurry 113, second solid-liquid phase separation step 1030, precious metal residue comprising ferrous iron 121, second metal bearing solution 122, and precious metal residue 123 are as described above. Moreover, as illustrated in FIG. 6, optional grinding step 140, optional second grinding step 1140, sulfur flotation step 150, and cyanide leach step 170 are as described above.

Moving to FIG. 7 in accordance with a further exemplary embodiment of the present invention, metal-bearing solution 14 from solid-liquid phase separation step 30 may be further processed in a solvent extraction step 200. In certain aspects of this exemplary embodiment, solvent extraction step 200 can be configured to selectively extract both a metal value, such as for example copper, and ferrous iron. During solvent extraction step 200, a metal value, such as for example copper, from metal bearing solution may be loaded selectively onto an organic chelating agent, for example, an aldoxime/ketoxime blend, resulting in a metal value containing organic stream and a raffinate solution 201. In various embodiments, the metal value containing organic stream may comprise a copper compound and ferrous iron. Solvent extraction step 200 can be configured to select for both a metal value, such as copper, and ferrous iron by the selection of an appropriate mixture of ketoximes and/or aldoximes. Solvent extraction step 200 can produce a raffinate solution 201 and a rich electrolyte 15. In various embodiments, solvent extraction step 200 can yield a rich electrolyte 15 comprising a metal value and ferrous iron.

Raffinate 201 from solvent extraction step 200 may be combined with second metal bearing slurry 113 and can be used in a number ways. For example, all or a portion of raffinate 201 combined with second metal bearing slurry 113 may be recycled to atmospheric leaching step 10 for temperature control and/or balance water in a metal recovery process. The use of raffinate 201 combined with second metal bearing slurry 113 in atmospheric leaching step 10 may be beneficial because the acid and ferric/ferrous iron values contained in raffinate 201 combined with second metal bearing slurry 113 can act to optimize the potential for leaching oxide and/or sulfide ores that commonly dominate heap leaching operations. That is, any ferric iron and acid remaining in raffinate 201 combined with second metal bearing slurry 113 may be used to optimize the Eh and/or pH of atmospheric leaching step 10. It should be appreciated that the properties of raffinate 201 combined with second metal bearing slurry 113, such as component concentrations, may be adjusted in accordance with the desired use of raffinate 201.

In various embodiments, a metal value 99 can be recovered from rich electrolyte 15 by electrowinning step 210 configured to utilize AART. In an exemplary embodiment, metal value 99 can be copper. Lean electrolyte 204 can be recycled from electrowinning step 210 back to solvent extraction step 200. In various embodiments, ferric iron is recycled from electrowinning step 210 to increase the production of ferrous iron in the product slurry from an atmospheric leaching step 10. As the atmospheric leaching step 10 consumes ferric iron by reducing ferric iron to ferrous iron, the atmospheric leaching step 10 may be used to reduce the ferrous iron needed for downstream electrowinning step 210 that utilize AART. As discussed herein, ferric iron produced from the AART reaction may be recycled into an atmospheric leach step 10 for reduction to ferrous iron. For example, ferric iron recycle 101 illustrates the flow of ferric iron into an atmospheric leach step 10 so that ferric iron may be reduced to ferrous iron.

Still referring to FIG. 7, in exemplary embodiments, a first portion of precious metal residue comprising ferrous iron 121 can be recycled to atmospheric leach step 10 via ferrous iron recycle 100. In exemplary embodiments, a second portion of precious metal residue comprising ferrous iron 121 can be subjected to several processing step and then can be processed by residue treatment step 34 and optionally by precious metal recovery step to yield precious metal value 95. In exemplary embodiments, a third portion of precious metal residue comprising ferrous iron 121 can be subjected to a neutralization step 235 to yield a residue 94 that may be in condition for disposal.

Returning to the second portion of precious metal residue comprising ferrous iron 121, the second portion can be optionally subjected to a grinding step 140 then can be subjected to a pH adjustment step 145. In an exemplary embodiment, pH adjustment step 145 neutralizes a ground second portion. A ground neutralized second portion can be subjected to a sulfur flotation step 150 to remove elemental sulfur 96. A second grinding step 1140 may be optionally utilized. The ground and essentially sulfur-free second portion can be processed by cyanide leach step 170. The precious metal slurry 213 produced by cyanide leach step 170 may comprise gold. Second solid liquid phase separation step 1030 can be configured to separate precious metal slurry 213 into precious metal solid 215 and liquid portion 214. In an exemplary embodiment, precious metal solid 215 can processed by processed by residue treatment step 34 and optionally by precious metal recovery step to yield precious metal value 95. Liquid portion 214 may be processed to produce a liquid that can be further utilized in a metal value recovery process or can be disposed of. Liquid portion 214 can be processed by a carbon in column 225 then acid washed 230 and processed by a stripping step 240. In addition, liquid portion 214 can be processed by a sulfide precipitation step 220 to remove sulfur for the liquid portion 214.

Figure 8:
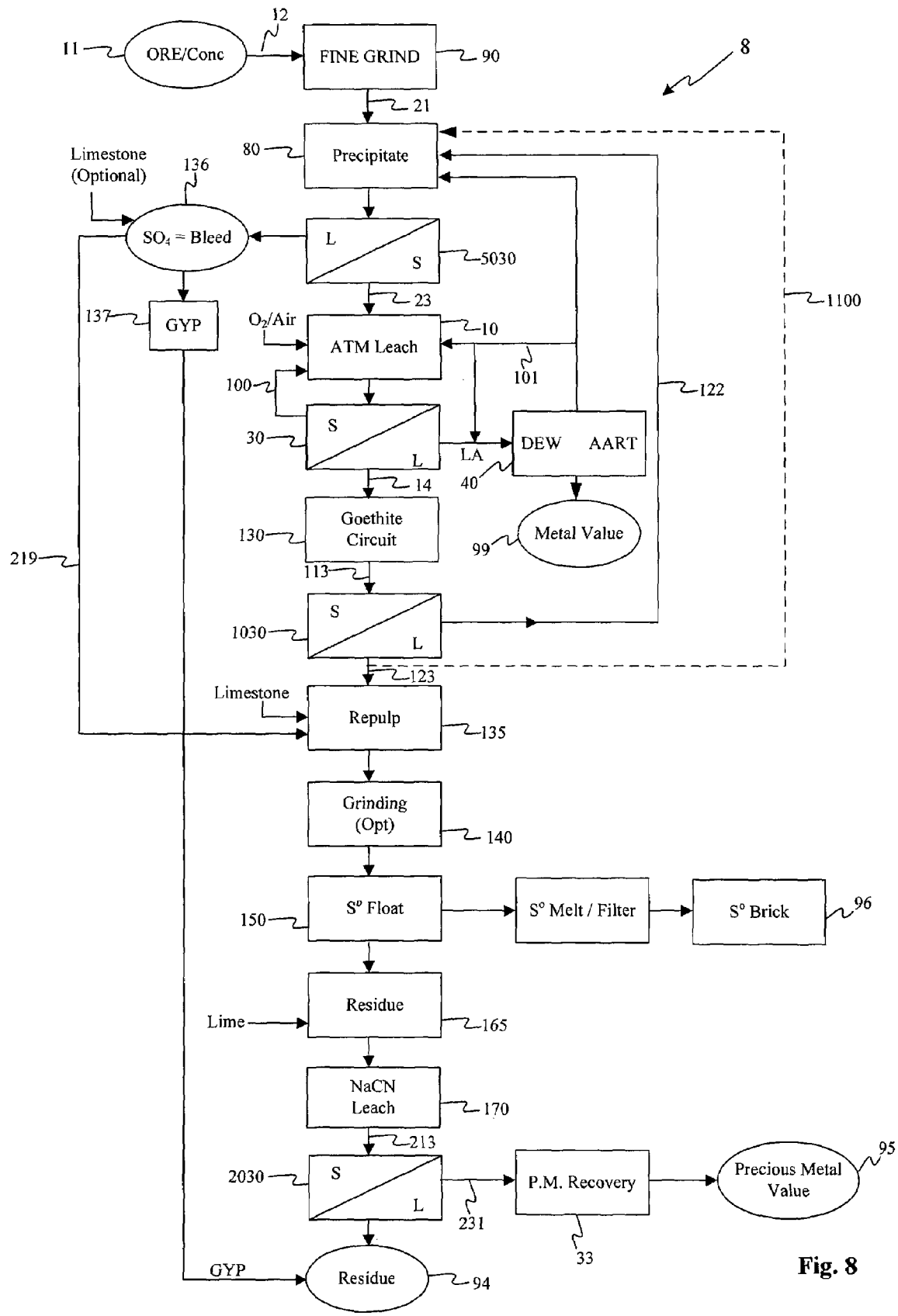
FIG. 8 illustrates a flow diagram illustrating a process in accordance with an exemplary embodiment of the present invention.

As illustrated in FIG. 8, metal recovery process 8 can be configured for recovery of a metal value and a precious metal value, in accordance to an exemplary embodiment of the present invention. For the sake of brevity, as illustrated in previous figures, metal bearing material 11, metal bearing stream 12, atmospheric leach step 10, metal bearing slurry 13, solid-liquid phase separation step 30, ferrous iron recycle 100, metal bearing solution 14, ferric iron recycle 101, high temperature pressure leach step 130, second metal bearing slurry 113, second solid-liquid phase separation step 1030, second metal bearing solution 122, precious metal residue 123, optional grinding step 140, sulfur flotation step 150, cyanide leach step 170, ground metal bearing material 21, ground metal bearing slurry 22, rough metal bearing solid 23, direct electrowinning 40, and metal value 99 are as described above.

With further reference to FIG. 8, preliminary solid liquid phase separation step 5030 can produce acid bleed 136 and rough metal bearing solid 23. In an exemplary embodiment, acid bleed 136 can optionally be combined with limestone to produce gypsum 137. Moving to second solid liquid phase separation step 1030, second metal bearing solution 122 can be recycled to precipitation step 80. In an aspect of exemplary embodiments, precious metal residue 123 can be processed by a repulp step 135 configured to combine limestone, acid bleed 136, and precious metal residue 123. In aspects of this exemplary embodiment, since precious metal residue 123 may comprise ferrous iron, a portion of precious metal residue 123 may be recycled to precipitation step 80 via second ferrous iron recycle 1100. After repulp step 135, the material can be optionally subjected to a grinding step 140 and then can be subjected to a sulfur flotation step 150 to remove elemental sulfur 96. The material can be then can be subjected to a residue step 165 configured to combine the material with lime and/or limestone. The residue material can be processed by cyanide leach step 170. The precious metal slurry 213 produced by cyanide leach step 170 may comprise gold. Third solid liquid phase separation step 2030 can be configured to separate precious metal slurry 213 into residue 94 and precious metal liquid portion 231. In an exemplary embodiment, precious metal liquid portion 231 can processed by processed by precious metal recovery step 33 to yield precious metal value 95.

Figure 9:
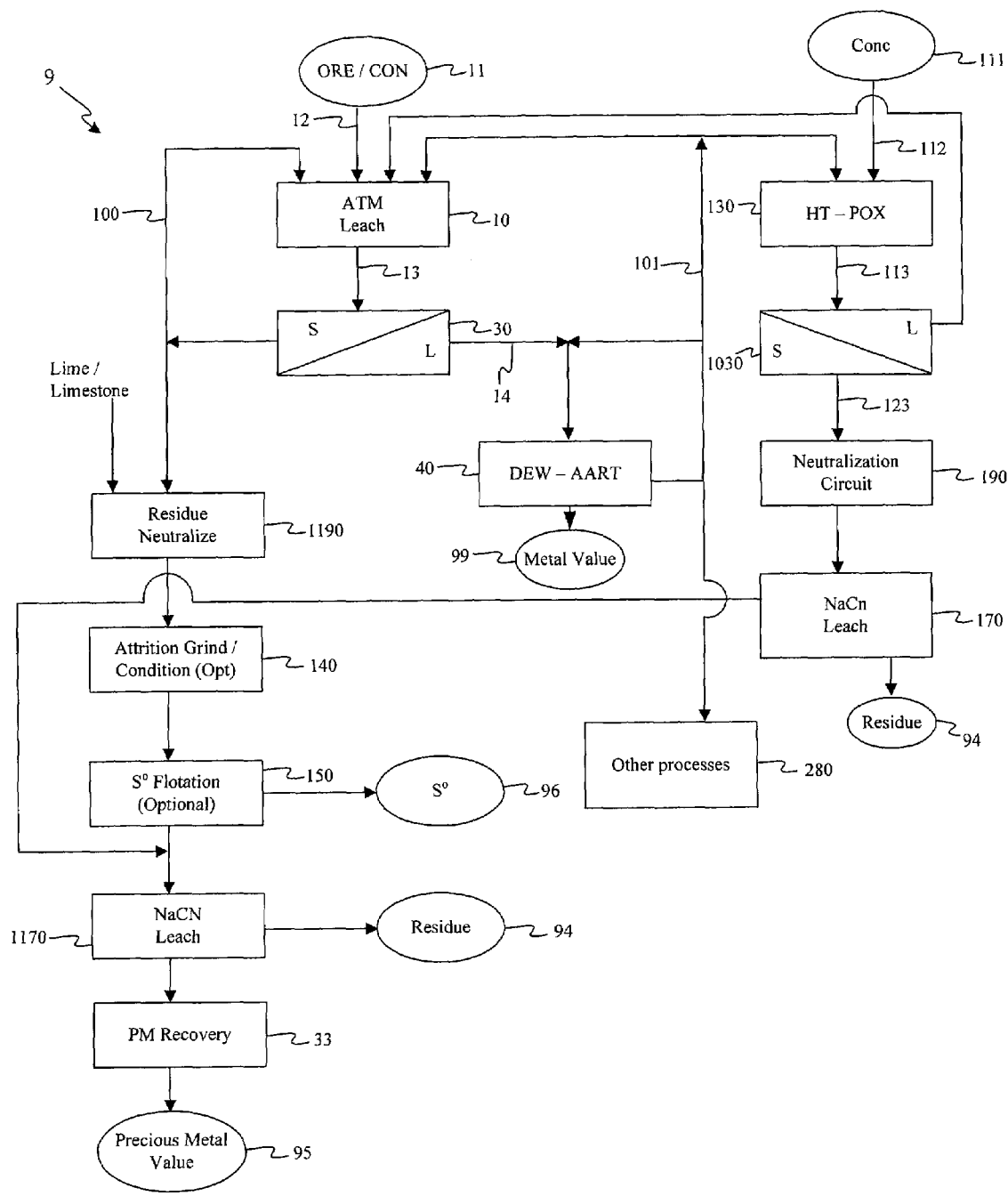
FIG. 9 illustrates a flow diagram illustrating a process in accordance with an exemplary embodiment of the present invention.

As illustrated in FIG. 9, metal recovery process 9 can be configured for recovery of a metal value and a precious metal value, in accordance to an exemplary embodiment of the present invention. For the sake of brevity, as illustrated in previous figures, metal bearing material 11, metal bearing stream 12, atmospheric leach step 10, metal bearing slurry 13, solid-liquid phase separation step 30, ferrous iron recycle 100, metal bearing solution 14, ferric iron recycle 101, high temperature pressure leach step 130, second metal bearing slurry 113, second solid-liquid phase separation step 1030, second metal bearing solution 122, precious metal residue 123, optional grinding step 140, sulfur flotation step 150, cyanide leach step 170, ground metal bearing material 21, ground metal bearing slurry 22, rough metal bearing solid 23, lean electrolyte 204, lean electrolyte bleed 205, heap leach and neutralization process 280, direct electrowinning 40, and metal value 99 are as described above.

Referring to FIG. 9, second solid liquid phase separation step 1030 can be configured to produce second metal bearing solution 122 and precious metal residue 123. In an aspect of exemplary embodiments, second metal bearing solution 122 can be recycled to atmospheric leach step 10. In another aspect of exemplary embodiments, precious metal residue 123 can be subjected to a neutralization step 190 and then can be process by cyanide leach step 170. Precious metal slurry 233 and residue 94 can be produce by cyanide leach step 170.

Figure 10:
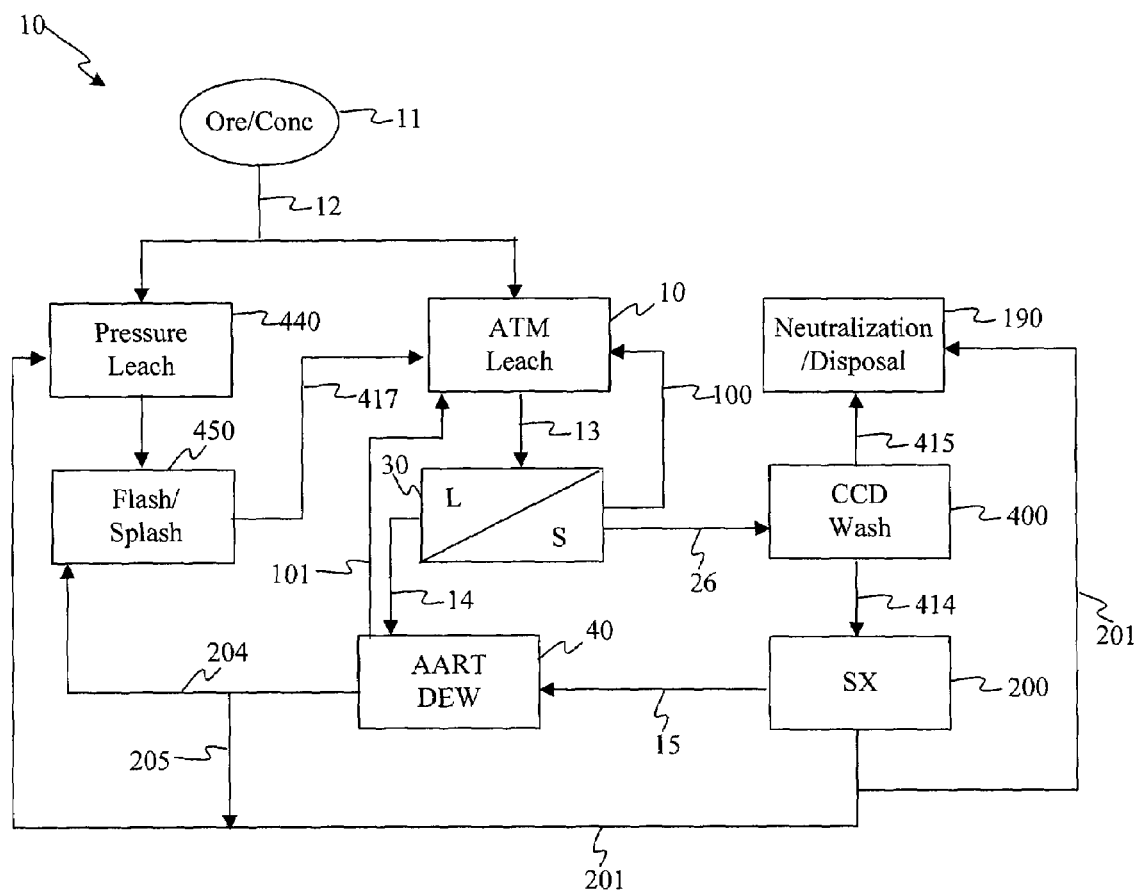
FIG. 10 illustrates a flow diagram illustrating a process in accordance with an exemplary embodiment of the present invention.

As illustrated in FIG. 10, a metal recovery process can be configured for recovery of a metal value and a precious metal value, in accordance to an exemplary embodiment of the present invention. For the sake of brevity, as illustrated in previous figures, metal bearing material 11, metal bearing stream 12, atmospheric leach step 10, metal bearing slurry 13, solid-liquid phase separation step 30, ferrous iron recycle 100, metal bearing solution 14, ferric iron recycle 101, high temperature pressure leach step 440, direct electrowinning 40, neutralization step 190, raffinate solution 201, solvent extraction step 200, metal bearing solid 26, rich electrolyte 15, lean electrolyte stream 204, and lean electrolyte bleed 205 are as described above.

Referring to FIG. 10, a metal bearing material 11 may be configured to enter one or more separate leach steps. In various embodiments, one or more leach steps include pressure leach step 440 and atmospheric leach step 10. Metal bearing material 11 from pressure leach step 440 may be flashed in flash/splash step 450 or otherwise conditioned. Flashed metal bearing material 417 may be subjected to atmospheric leach step 10. In this manner, heat and/or steam from flashed metal bearing material 417 may be transferred to atmospheric leach 10. In an aspect of exemplary embodiments, metal bearing slurry 13 from atmospheric leach 10 may be processed by solid liquid phase separation 30 into metal bearing solution 14 and metal bearing solid 26. Metal bearing solution 14 can be subjected to direct electrowinning 40 to yield metal value 99. Metal bearing solid 26 can be subjected to counter current decantation wash (CCD) step 400. CCD step 400 may be conducted with fresh water and/or raffinate solution 201. CCD solid material 415 may be disposed and/or neutralized in neutralization step 190. CCD liquid material 414 may be subjected to solvent extraction step 200. Solvent extraction step 200 may be useful in extracting any remaining copper in CCD liquid material 414 for use in subsequent direct electrowinning 40. Raffinate solution 201 may be used to cool pressure leach 440. Lean electrolyte bleed 205 may comprise a portion of raffinate solution 201.

In an exemplary embodiment, a first portion of precious metal residue comprising ferrous iron 121 can be recycled to atmospheric leach step 10 via ferrous iron recycle 100. In exemplary embodiments, a second portion of precious metal residue comprising ferrous iron 121 can be subjected to several processing steps and then can be processed by precious metal recovery step 33 to yield precious metal value 95. Second portion of precious metal residue comprising ferrous iron 121 can be subjected to a residue neutralization step 1190 configured to combine the second portion of precious metal residue comprising ferrous iron 121 with lime and/or limestone. The combined neutralized material can be subjected to an optional grinding step 140. The ground combined neutralized material can be subjected to a sulfur flotation step 150 to remove elemental sulfur 96. In an aspect of exemplary embodiments, the ground sulfur-free material can be combined with precious metal slurry 233 to produce a combined material 241. A second cyanide leach step can be configured to process the combined material to produce a residue 94 and a precious metal material 242. The resulting precious metal material 242 can be processed by precious metal recovery step 33 to yield precious metal value 95.

In various embodiments of the present invention, one or more leach steps may be subjected to a ferrous iron recycle 100 and a subsequent direct electrowinning 40 using an alternative anode reaction process. Again, in an exemplary embodiment of this invention, the ferrous iron species is pyrite, most preferably, pyrite is recycled from a solid/liquid phase separation stage 30 after the leaching step 10. In various embodiments, one or more leach steps may be subjected to a ferrous iron recycle 100 and a subsequent solvent extraction step 200 and electrowinning step 210 using an alternative anode reaction process.

As ferrous iron is oxidized at the anode in the electrochemical cell of electrowinning 40, 210, the concentration of ferrous iron in the electrolyte is depleted, while the concentration of ferric iron in the electrolyte is increased. As the concentration of ferric iron in the electrolyte is increased, the ferric iron is delivered to the atmospheric leach step 10 via a ferric iron recycle 101. The concentration of ferric iron in the electrolyte in the atmospheric leach step 10 decreases during the leach process as the concentration of ferrous iron in the electrolyte increases. In accordance with various embodiments, as the concentration of ferrous iron in the electrolyte of the atmospheric leaching step 10 increases, ferrous iron is delivered to subsequent processing steps. In various embodiments, ferrous iron is delivered to electrowinning step 40, 210. Where direct electrowinning is used, the ferrous iron bearing material may be subjected to one or more conditioning step 55 as described herein. In various embodiments, ferrous iron is delivered to an electrowinning step 210 after undergoing solvent extraction 200.

In accordance with one aspect of the invention, ferrous iron, for example, in the form of pyrite ($FeS_2$), is added to the copper-rich electrolyte to be subjected to electrowinning, to cause the ferrous/ferric ($Fe^{2+}/Fe^{3+}$) couple to become the anode reaction. In so doing, the ferrous/ferric anode reaction replaces the decomposition of water anode reaction. Because there is no oxygen gas produced in the ferrous/ferric anode reaction, generation of "acid mist" as a result of the reactions in the electrochemical cell is eliminated. In addition, because the equilibrium potential of the $Fe^{2+}/Fe^{3+}$ couple (i.e., $E^0=-0.770\,V$) is less than that for the decomposition of water (i.e., $E^0=-1.230\,V$), the cell voltage is decreased, thereby decreasing cell energy consumption. Furthermore, in accordance with one aspect of the invention, ferrous iron can be created in an atmospheric leach step 10 and used in the ferrous/ferric electrowinning anode reaction in electrowinning 40, 210.

In accordance with various aspects of the invention, electrowinning may be performed in a variety of ways under a variety of conditions. While various configurations and combinations of anodes and cathodes in the system electrochemical cell may be used effectively in connection with various embodiments of the invention, preferably a flow-through anode is used and electrolyte circulation is provided using an electrolyte flow manifold capable of maintaining satisfactory flow and circulation of electrolyte within the electrowinning cell.

Generally speaking, increasing the operating current density in an electrowinning cell increases the cell voltage. This increased voltage demand translates into increased energy costs for producing copper, which affects the profitability of the electrowinning operation. On the other hand, certain other parameters in alternative anode reaction processes—such as, for example, temperature and iron concentration in the electrolyte—may be controlled in a manner that mitigates the effect of increased current density on cell voltage. For instance, as the temperature of the electrolyte is increased, cell voltage tends to decrease. Similarly, as the concentration of iron in the electrolyte, and more specifically concentration of ferrous iron adjacent to the anode, increases, voltage tends to decrease in electrowinning cells employing the alternative anode reaction. Nevertheless, the mitigating effect of increased temperature and increased iron concentration on high cell voltage is limited.

In general, processes and systems configured according to various embodiments of the present invention enable the efficient and cost-effective utilization of the alternative anode reaction in copper electrowinning at a cell voltage of less than about 1.5 V and at current densities of greater than about 26 $A/ft^2$ (about 280 $A/m^2$). Furthermore, the use of such processes and/or systems reduces generation of acid mist and permits the use of low ferrous iron concentrations in the electrolyte and optimized electrolyte flow rates, as compared to prior art systems, while producing high quality, commercially saleable product.

Generally speaking, as the operating current density in the electrochemical cell increases, the copper plating rate increases. Stated another way, as the operating current density increases, more cathode copper is produced for a given time period and cathode active surface area than when a lower operating current density is achieved. Alternatively, by increasing the operating current density, the same amount of copper may be produced in a given time period, but with less active cathode surface area (i.e., fewer or smaller cathodes, which corresponds to lower capital equipment costs and lower operating costs). However, as the current density is increased, the conversion rate of ferrous iron to ferric iron increases.

As current density increases using the ferrous/ferric anode reaction, cell voltage tends to increase due in part to the depletion of ferrous ions at the anode surface. This can be compensated for by increasing transport of ferrous ions to the anode as current density increases in order to maintain a low cell voltage. The prior art was limited to current densities of 26 $A/ft^2$ (280 $A/m^2$) and below for copper electrowinning using the ferrous/ferric anode reaction in large part because of ferrous iron transport limitations. Stated another way, previous attempts that increased flow rates and increased iron concentration in the electrolyte to achieve high current densities were unsuccessful in decreasing overall cell voltage. Various embodiments of the present invention allow for operation at current densities above—and significantly above—26 $A/ft^2$ while maintaining cell voltages of less than about 1.5 V.

In accordance with other exemplary embodiments of the invention, a system for operating an alternative anode reaction process includes an electrochemical cell equipped with at least one flow-through anode and at least one cathode, wherein the cell is configured such that the flow and circulation of electrolyte within the cell enables the cell to be advantageously operated at a cell voltage of less than about 1.5 V and at a current density of greater than about 26 $A/ft^2$. Embodiments of the present invention permit operation of electrochemical cells using the ferrous/ferric anode reaction at current densities of from about 26 to about 35 $A/ft^2$ at cell voltages of less than about 1.0 V; up to about 40 $A/ft^2$ at cell voltages of less than about 1.25 V; and up to about 50 $A/ft^2$ or greater at cell voltages of less than about 1.5 V.

In an exemplary embodiment of the invention, a current density of from about 20 to about 50 amps per square foot of active cathode (about 215 A/m$^2$ to about 538 A/m$^2$) is maintained, preferably greater than about 26 A/ft$^2$ (280 A/m$^2$), and more preferably greater than about 30 A/ft$^2$ (323 A/m$^2$) of active cathode. It should be recognized, however, that the maximum operable current density achievable in accordance with various embodiments of the present invention will depend upon the specific configuration of the process apparatus, and thus an operating current density in excess of 50 A/ft$^2$ (538 A/m$^2$) of active cathode may be achievable in accordance with the present invention.

Various mechanisms may be used in accordance with the present invention to enhance electrolyte flow, as detailed herein. For example, an electrolyte flow manifold configured to inject electrolyte into the anode may be used, as well as exposed "floor mat" type manifold configurations and other forced-flow circulation means. In accordance with various embodiments of the invention, any flow mechanism that provides an electrolyte flow effective to transport ferrous iron to the anode, to transport ferric iron from the anode, and to transport copper ions to the cathode such that the electrowinning cell may be operated at a cell voltage of less than about 1.5 V and at a current density of greater than about 26 amps per square foot (A/ft$^2$), is suitable.

In accordance with one exemplary embodiment of the present invention, a flow-through anode with an electrolyte injection manifold is incorporated into the cell. As used herein, the term "flow-through anode" refers to any anode configured to enable electrolyte to pass through it. While fluid flow from the manifold provides electrolyte movement, a flow-through anode allows the electrolyte in the electrochemical cell to flow through the anode during the electrowinning process. The use of a flow-through anode with manifold electrolyte injection decreases cell voltage at low electrolyte flow rates and at low electrolyte iron concentrations through enhanced diffusion of ferrous iron to the anode. In accordance with various aspects of exemplary embodiments of the invention, electrolyte injection manifolds with bottom injection, side injection, and/or in-anode injection are incorporated into the cell to enhance ferrous iron diffusion. Overall cell voltages of less than about 1.5 V may be achieved, though it is preferable to achieve a cell voltage of less than about 1.20 V or about 1.25 V, and more preferable to achieve a cell voltage of less than about 0.9 V or about 1.0 V.

Any now known or hereafter devised flow-through anode may be utilized in accordance with various aspects of the present invention. Possible configurations include, but are not limited to, metal wool or fabric, an expanded porous metal structure, metal mesh, multiple metal strips, multiple metal wires or rods, perforated metal sheets, and the like, or combinations thereof. Moreover, suitable anode configurations are not limited to planar configurations, but may include any suitable multiplanar geometric configuration.

While not wishing to be bound by any particular theory of operation, anodes so configured allow better transport of ferrous iron to the anode surface for oxidation, and better transport of ferric iron away from the anode surface. Accordingly, any configuration permitting such transport is within the scope of the present invention.

Anodes employed in conventional electrowinning operations typically comprise lead or a lead alloy, such as, for example, Pb—Sn—Ca. One disadvantage of such anodes is that, during the electrowinning operation, small amounts of lead are released from the surface of the anode and ultimately cause the generation of undesirable sediments, "sludges," particulates suspended in the electrolyte, or other corrosion products in the electrochemical cell and contamination of the copper cathode product. For example, copper cathode produced in operations employing a lead-containing anode typically comprises lead contaminant at a level of from about 1 ppm to about 4 ppm. Moreover, lead-containing anodes have a typical useful life limited to approximately four to seven years. In accordance with one aspect of a preferred embodiment of the present invention, the anode is substantially lead-free. Thus, generation of lead-containing sediments, "sludges," particulates suspended in the electrolyte, or other corrosion products and resultant contamination of the copper cathode with lead from the anode is avoided.

Preferably, in accordance with an exemplary embodiment of the present invention, the anode is formed of one of the so-called "valve" metals, including titanium (Ti), tantalum (Ta), zirconium (Zr), or niobium (Nb). The anode may also be formed of other metals, such as nickel, or a metal alloy, intermetailic mixture, or a ceramic or cermet containing one or more valve metals. For example, titanium may be alloyed with nickel (Ni), cobalt (Co), iron (Fe), manganese (Mn), or copper (Cu) to form a suitable anode. Preferably, the anode comprises titanium, because, among other things, titanium is rugged and corrosion-resistant. Titanium anodes, for example, when used in accordance with various aspects of embodiments of the present invention, potentially have useful lives of up to fifteen years or more.

The anode may also comprise any electrochemically active coating. Exemplary coatings include those provided from platinum, ruthenium, iridium, or other Group VIII metals, Group VIII metal oxides, or compounds comprising Group VIII metals, and oxides and compounds of titanium, molybdenum, tantalum, and/or mixtures and combinations thereof. Ruthenium oxide and iridium oxide are preferred for use as the electrochemically active coating on titanium anodes when such anodes are employed in connection with various embodiments of the present invention. In accordance with one embodiment of the invention, the anode is formed of a titanium metal mesh coated with an iridium-based oxide coating. In another embodiment of the invention, the anode is formed of a titanium mesh coated with a ruthenium-based oxide coating. Anodes suitable for use in accordance with various embodiments of the invention are available from a variety of suppliers.

Conventional copper electrowinning operations use either a copper starter sheet or a stainless steel or titanium "blank" as the cathode. In accordance with one aspect of an exemplary embodiment of the invention, the cathode is configured as a metal sheet. The cathode may be formed of copper, copper alloy, stainless steel, titanium, or another metal or combination of metals and/or other materials. As is generally well known in the art, the cathode is typically suspended from the top of the electrochemical cell such that a portion of the cathode is immersed in the electrolyte within the cell and a portion (generally a relatively small portion, less than about twenty percent (20%) of the total surface area of the cathode) remains outside the electrolyte bath. The total surface area of the portion of the cathode that is immersed in the electrolyte during operation of the electrochemical cell is referred to herein, and generally in the literature, as the "active" surface area of the cathode. This is the portion of the cathode onto which copper is plated during electrowinning.

In accordance with another aspect of an exemplary embodiment of the invention, the anode comprises a titanium mesh (or other metal, metal alloy, intermetallic mixture, or ceramic or cermet as set forth above) upon which a coating comprising carbon, graphite, a mixture of carbon and graphite, a precious metal oxide, or a spinel-type coating is applied.

Preferably, in accordance with one exemplary embodiment, the anode comprises a titanium mesh with a coating comprised of a mixture of carbon black powder and graphite powder.

In accordance with an exemplary embodiment of the invention, the anode comprises a carbon foam, graphite foam, or a metal-graphite sintered material wherein the exemplary metal described is titanium. In accordance with other embodiments of the invention, the anode may be formed of a carbon composite material. Examples of such composite materials include polycrystalline graphite, polycrystalline graphite coated or densified with a graphitizable pitch material or pyrolytic carbon, graphite foam coated or densified with graphitizable pitch or pyrolytic carbon, a metal-graphite sintered material coated or densified with graphitizable pitch or pyrolytic carbon, fiber-reinforced carboncarbon composites, graphite and/or carbon coated metallic mesh, and the like. In these applications, the coating or densification seals the structure preventing particle removal, while increasing strength, toughness, and conductivity. The coating may contain fiber reinforcement in order to further enhance performance characteristics.

In accordance with one aspect of an exemplary embodiment, the graphite foam is produced from a mesophase pitch material such as described by Klett et al. in U.S. Pat. No. 6,261,4850 Unlike polymeric resin-based precursors such as, for example, phenolic resin, polyvinyledene fluoride resin, polyacrylonitrile resin, phenol/formaldehyde resin, urethane resin, and the like, mesophase pitch foam is graphitizable and is highly conductive electrically, when graphitized, forming an electrically-continuous-low-resistance structure.

To increase the mechanical properties and conductivity of this foam material, it can be coated or densified with a graphitizable material such as that formed from the pyrolysis of a hydrocarbon gas, such as methane or a pitch-based material in the form of petroleum pitch, coal tar pitch, or mesophase pitch formed by, for example, a heat-soak, salvation, or catalytic polymerization process.

In accordance with another aspect of an exemplary embodiment, a fiber reinforced carbon-carbon composite may comprise fibers in one or more dimensions that may be positioned in an oriented fashion by any technique now known or hereafter devised, such as, for example, weaving, braiding, and filament winding, or in random fashion (such as in the case of a felt). These fibers form a preform which is densified with a matrix material that rigidizes the preform, fills in the porosity thereby increasing the density, increases the toughness, and increases the conductivity if it is graphitizable. It should be noted, however, that different materials can be employed to rigidize and densify the preform. The carbon fibers employed in the fabrication of fiber-reinforced composites preferably comprise pitch-based, mesophase pitch-based, and catalytically-produced carbon and graphite fibers, such as, for example, those produced by Applied Sciences of Cedarville, Ohio. However, polyacrilonitrile and rayon-based carbon fibers may also be employed. The matrix employed in the fabrication of fiber reinforced composite preferably may comprise a petroleum pitch-based precursor, a coal tar pitch-based precursor, a polymeric resin-based polymer precursor, a gas phase hydrocarbon-based precursor, or a mesophase pitch-based precursor. In accordance with one exemplary embodiment, the matrix is a mesophase pitch-based precursor impregnated into the composite.

It should be noted that to further increase the conductivity of these composite materials, graphitizable particulates such as graphitized carbon black, carbon nanotubes, and/or graphite flakes or particles may also be incorporated in the composite. In addition, all these carbon-based materials can be heat-treated to temperatures between about 1500° C. and about 3000° C., and preferably between about 2500° C. and about 3000° C., to graphitize these materials in order to further increase their conductivity.

Moreover, a metal in the metallic mesh or metal-graphite sintered exemplary embodiment is described herein and shown by example using titanium; however, any metal may be used without detracting from the scope of the present invention. Exemplary embodiments of such anodes are set forth in various of the Examples herein.

In accordance with one exemplary embodiment, a wire mesh may be welded to the conductor rods, wherein the wire mesh and conductor rods may comprise materials as described above for anodes. In one exemplary embodiment, the wire mesh comprises of a woven wire screen with 80 by 80 strands per square inch, however various mesh configurations may be used, such as, for example, 30 by 30 strands per square inch.

Moreover, various regular and irregular geometric mesh configurations may be used. In accordance with yet another exemplary embodiment, a flow-through anode may comprise a plurality of vertically-suspended stainless steel rods, or stainless steel rods fitted with graphite tubes or rings. In accordance with another aspect of an exemplary embodiment, the hanger bar to which the anode body is attached comprises copper.

In accordance with various embodiments of the present invention, the cathode may be configured in any manner now known or hereafter devised by the skilled artisan.

In various embodiments, a flow through cathode may be used. As used herein, the term "flow-through cathode" refers to any cathode configured to enable electrolyte to pass through it. While fluid flow from an electrolyte flow manifold provides electrolyte movement, a flow-through cathode allows the electrolyte in the electrochemical cell to flow through the cathode during the electrowinning process.

Various flow-through cathode configurations may be suitable, including: (1) multiple parallel metal wires, thin rods, including hexagonal rods or other geometries, (2) multiple parallel metal strips either aligned with electrolyte flow or inclined at an angle to flow direction, (3) metal mesh, (4) expanded porous metal structure, (5) metal wool or fabric, and/or (6) conductive polymers. The cathode may be formed or copper, copper alloy, stainless steel, titanium, aluminum, or any other metal or combination of metals and/or other materials. The surface finish of the cathode (e.g., whether polished or unpolished) may affect the harvestability of the copper powder. Polishing or other surface finishes, surface coatings, surface oxidation layer(s), or any other suitable barrier layer may advantageously be employed to enhance harvestability. Alternatively, unpolished or surfaces may also be utilized.

An exemplary flow-through cathode suitable for use in accordance with one aspect of an embodiment of the present invention generally comprises a flow-through body portion comprising multiple thin rods that are suspended from a bus bar. Multiple thin rods preferably are approximately the same length, diameter, and material of construction, and are preferably spaced approximately evenly along the length of a bus bar. A bus bar may be substantially straight and configured to be positioned horizontally in an electrowinning cell. Other configurations may, however, be utilized, such as, for example, "steerhorn" configurations, multi-angled configurations, and the like. Moreover, a cathode may be unframed, framed, and may comprise electrical insulators on the ends of thin rods, or may have any other suitable structural configuration. Thin rods may have any suitable cross-sectional geometry, such as, for example, round, hexagonal, square, rectangular, octagonal, oval, elliptical, or any other desired geometry. The desired cross-sectional geometry of thin rods may be chosen to optimize harvestability of copper powder and/or to optimize flow and/or mass transfer characteristics of the electrolyte within the electrowinning apparatus.

In certain embodiments of the present invention, the effect of enhanced electrolyte circulation on the cathode reaction is to promote effective transfer of copper ions. In order to promote a cathode deposit that is of high quality, the electrolyte circulation system should promote effective diffusion of copper ions to the cathode surface. When the copper diffusion rate is sufficiently hindered, the crystal growth pattern can change to an unfavorable structure that may result in a rough cathode surface. Excessive cathode roughness can cause an increase in porosity that can entrain electrolyte, and thus impurities, in the cathode surface. An effective diffusion rate of copper is one that promotes favorable crystal growth for smooth, high quality cathodes. Higher current density requires a higher rate of copper transfer to the cathode surface. For production of high quality, commercially acceptable cathodes, the maximum practical current density is limited in part by the copper diffusion rate that promotes favorable crystal growth patterns. In the present invention, the electrolyte circulation system utilized in the electrochemical cell to facilitate the ionic transfer to or from the anode is also effective at promoting effective diffusion of copper ions to the cathode. For example, use of the flow through anode enhances the copper ion transfer to the cathode in a similar manner to the ferrous and ferric ion transfer to and from the anode.

Generally speaking, as the operating current density in the electrochemical cell increases, the copper plating rate increases. Stated another way, as the operating current density increases, more cathode copper is produced for a given time period and cathode active surface area than when a lower operating current density is achieved. Alternatively, by increasing the operating current density, the same amount of copper may be produced in a given time period, but with less active cathode surface area (i.e., fewer or smaller cathodes, which corresponds to lower capital equipment costs and lower operating costs).

In accordance with an exemplary embodiment, the copper concentration in the electrolyte for electrowinning is advantageously maintained at a level of from about 20 to about 60 grams of copper per liter of electrolyte. Preferably, the copper concentration is maintained at a level of from about 30 to about 50 g/L, and more preferably, from about 40 to about 45 g/L. However, various aspects of the present invention may be beneficially applied to processes employing copper concentrations above and/or below these levels.

Generally speaking, any electrolyte pumping, circulation, or agitation system capable of maintaining satisfactory flow and circulation of electrolyte between the electrodes in an electrochemical cell such that the process specifications described herein are practicable may be used in accordance with various embodiments of the invention.

Injection velocity of the electrolyte into the electrochemical cell may be varied by changing the size and/or geometry of the holes through which electrolyte enters the electrochemical cell. Any number of configurations of differently directed and spaced injection holes are possible. For example, although the injection holes are approximately parallel to one another and similarly directed, configurations comprising a plurality of opposing injection streams or intersecting injection streams may be beneficial in accordance with various embodiments of the invention.

In accordance with various embodiments of the invention, the electrolyte flow manifold comprises tubing or piping suitably integrated with, attached to, or inside the anode structure, such as, for example, inserted between the mesh sides of an exemplary flow-through anode. Yet another exemplary embodiment is illustrated in, wherein a manifold is configured to inject electrolyte between the mesh sides and of anode. Manifold includes a plurality of interconnected pipes or tubes extending approximately parallel to the mesh sides and of anode and each having a number of holes formed therein for purposes of injecting electrolyte into anode, preferably in streams flowing approximately parallel to the mesh sides and.

In accordance with an exemplary embodiment of the invention, electrolyte flow rate is maintained at a level of from about 0.1 gallons per minute per square foot of active cathode (about 4.0 L/min/m$^2$) to about 1.0 gallons per minute per square foot of active cathode (about 40.0 L/min/m$^2$). Preferably, electrolyte flow rate is maintained at a level of from about 0.1 gallons per minute per square foot of active cathode (about 4.0 L/min/m$^2$) to about 0.25 gallons per minute per square foot of active cathode (about 10.0 L/min/m$^2$). It should be recognized, however, that the optimal operable electrolyte flow rate useful in accordance with the present invention will depend upon the specific configuration of the process apparatus, and thus flow rates in excess of about 1.0 gallons per minute per square foot of active cathode (in excess of about 40.0 L/min/m$^2$) or less than about 0.1 gallons per minute per square foot of active cathode (less than about 4.0 L/min/m$^2$) may be optimal in accordance with various embodiments of the present invention.

Generally, as the operating temperature of the electrochemical cell (e.g., the electrolyte) increases, better plating at the cathode is achievable. While not wishing to be bound by any particular theory, it is believed that elevated electrolyte temperatures provide additional reaction energy and may provide a thermodynamic reaction enhancement that, at constant cell voltage, results in enhanced copper diffusion in the electrolyte as temperature is increased. Moreover, increased temperature also may enhance ferrous diffusion, and can result in overall reduction of the cell voltage, which in turn results in greater economic efficiency. Conventional copper electrowinning cells typically operate at temperature from about 115° F. to about 125° F. (from about 46° C. to about 52° C.).

In accordance with one aspect of an exemplary embodiment of the present invention, the electrochemical cell is operated at a temperature of from about 110° F. to about 180° F. (from about 43° C. to about 83° C.). Preferably, the electrochemical cell is operated at a temperature above about 115° F. (about 46° C.) or about 120° F. (about 48° C.), and preferably at a temperature below about 140° F. (about 60° C.) or about 150° F. (about 65° C.). However, in certain applications, temperatures in the range of about 155° F. (about 68° C.) to about 165° F. (about 74° C.) may be advantageous.

It should be recognized, however, that while higher operating temperatures may be beneficial for the reasons outlined above, operation at such higher temperatures may require the use of materials of construction designed and selected to satisfactorily withstand the more rigorous operating conditions. In addition, operation at higher temperatures may require increased energy demands.

The operating temperature of the electrochemical cell may be controlled through any one or more of a variety of means well known in the art, including, for example, an immersion heating element, an in-line heating device (e.g., a heat exchanger), or the like, preferably coupled with one or more feedback temperature control means for efficient process control.

A smooth plating surface is optimal for cathode quality and purity, because a smooth cathode surface is denser and has fewer cavities in which electrolyte can become entrained, thus introducing impurities to the surface. Although it is preferable that the current density and electrolyte flow rate parameters be controlled such that a smooth cathode plating surface is achievable, operating the electrochemical cell at a high current density may nonetheless tend to result in a rough cathode surface. Thus, in accordance with one aspect of an exemplary embodiment of the present invention, an effective amount of a plating reagent is added to the electrolyte stream to enhance the plating characteristics—and thus the surface characteristics—of the cathode, resulting in improved cathode purity. Any plating reagent effective in improving the plating surface characteristics, namely, smoothness and porosity, of the cathode may be used. For example, suitable plating reagents (sometimes called "smoothing agents") may include thiourea, guar gums, modified starches, polyacrylic acid, polyacrylate, chloride ion, and/or combinations thereof may be effective for this purpose. When used, an effective concentration of the plating reagent in the electrolyte—or, stated another way, the effective amount of plating reagent required—invariably will depend upon the nature of the particular plating reagent employed; however, the plating reagent concentration generally will be in the range of from about 20 grams of plating reagent per tonne of copper plated to about 1000 g/tonne.

In order for the ferrous/ferric couple to maintain a continuous anode reaction, the ferric iron generated at the anode preferably is reduced back to ferrous iron to maintain a satisfactory ferrous concentration in the electrolyte. Additionally, the ferric iron concentration preferably is controlled to achieve satisfactory current efficiency in the electrochemical cell.

Finally, as used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but can also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the instant invention and are intended to be included in this disclosure.

Moreover, unless specifically noted, it is the Applicant's intent that the words and phrases in the specification and the claims be given the commonly accepted generic meaning or an ordinary and accustomed meaning used by those of reasonable skill in the applicable arts. In the instance where these meanings differ, the words and phrases in the specification and the claims should be given the broadest possible, generic meaning. If it is intended to limit or narrow these meanings, specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

The invention claimed is:

1. A method of recovering a metal value from an ore, the method comprising:
providing an ore;
subjecting said ore to atmospheric leaching to yield a metal bearing slurry comprising said metal value and ferrous iron;
separating said metal bearing slurry into a metal bearing solution comprising said metal value and a first portion of said ferrous iron and a metal bearing solid comprising a second portion of said ferrous iron;
recycling at least a portion of said second portion of said ferrous iron to said leaching step;
extracting said metal value and said ferrous iron from said metal bearing solution to yield a rich electrolyte; and
electrowinning said rich electrolyte by oxidizing said first portion of ferrous iron to ferric iron at an anode of an electrowinning cell and reducing said metal value at a cathode of said electrowinning cell.

2. The method according to claim 1 further comprising conditioning said metal bearing solution before said oxidizing said metal bearing solution.

3. The method according to claim 1 further comprising recycling said ferric iron to said leaching step.

4. The method according to claim 3 further comprising reducing said ferric iron to said ferrous iron during said leaching step.

5. The method according to claim 1 further comprising grinding said ore before said leaching said ore.

\* \* \* \* \*